United States Patent
Lee et al.

(10) Patent No.: US 9,184,802 B2
(45) Date of Patent: Nov. 10, 2015

(54) COMMUNICATION OF WIRELESS POWER RECEIVER THROUGH WIRELESS POWER SIGNAL

(75) Inventors: Jaesung Lee, Gangwon-Do (KR); Inchang Chu, Seoul (KR); Jeongkyo Seo, Anyang-Si (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 14/232,582

(22) PCT Filed: Jul. 21, 2011

(86) PCT No.: PCT/KR2011/005398
§ 371 (c)(1),
(2), (4) Date: Feb. 11, 2014

(87) PCT Pub. No.: WO2013/012114
PCT Pub. Date: Jan. 24, 2013

(65) Prior Publication Data
US 2015/0078461 A1    Mar. 19, 2015

(51) Int. Cl.
| H04L 7/00 | (2006.01) |
| H04B 5/00 | (2006.01) |
| H04B 1/16 | (2006.01) |
| H04B 5/02 | (2006.01) |

(52) U.S. Cl.
CPC ............. *H04B 5/0037* (2013.01); *H04B 1/16* (2013.01); *H04B 5/0031* (2013.01); *H04B 5/0075* (2013.01); *H04B 5/02* (2013.01)

(58) Field of Classification Search
USPC ................. 375/354, 356; 370/445, 449, 458
See application file for complete search history.

(56) References Cited

U.S. PATENT DOCUMENTS

| 2007/0273486 A1 | 11/2007 | Shiotsu et al. |
| 2008/0211455 A1 | 9/2008 | Park et al. |
| 2008/0299907 A1 | 12/2008 | Takayama |
| 2010/0181961 A1 | 7/2010 | Novak et al. |
| 2011/0065398 A1* | 3/2011 | Liu et al. ............... 455/127.1 |
| 2011/0081857 A1 | 4/2011 | Lee et al. |
| 2011/0127953 A1* | 6/2011 | Walley et al. .............. 320/108 |

FOREIGN PATENT DOCUMENTS

| KR | 10-2004-0028312 A | 4/2004 |
| KR | 10-2007-0015264 A | 2/2007 |
| KR | 10-2010-0012944 A | 2/2010 |
| KR | 10-2010-0062416 A | 6/2010 |

* cited by examiner

*Primary Examiner* — Kevin Kim
(74) *Attorney, Agent, or Firm* — Birch, Stewart, Kolasch & Birch, LLP

(57) ABSTRACT

The present specification discloses as one embodiment a power receiver for transmitting a message by using a power transmission signal. The power receiver comprises: a power reception portion for receiving the wireless power signal that is formed by a power transmitter; a demodulation portion for demodulating the received wireless power signal; a modulation portion for modulating the received wireless power signal; and a control portion for decoding a first packet from the wireless power signal that is demodulated by means of the demodulation portion, for determining whether a second packet that does not collide with the first packet which has been decoded can be transmitted, and for modulating the received wireless power signal so as to comprise the second packet by controlling the modulation portion, when transmission is possible according to the result of the determination.

14 Claims, 17 Drawing Sheets

FIG. 4
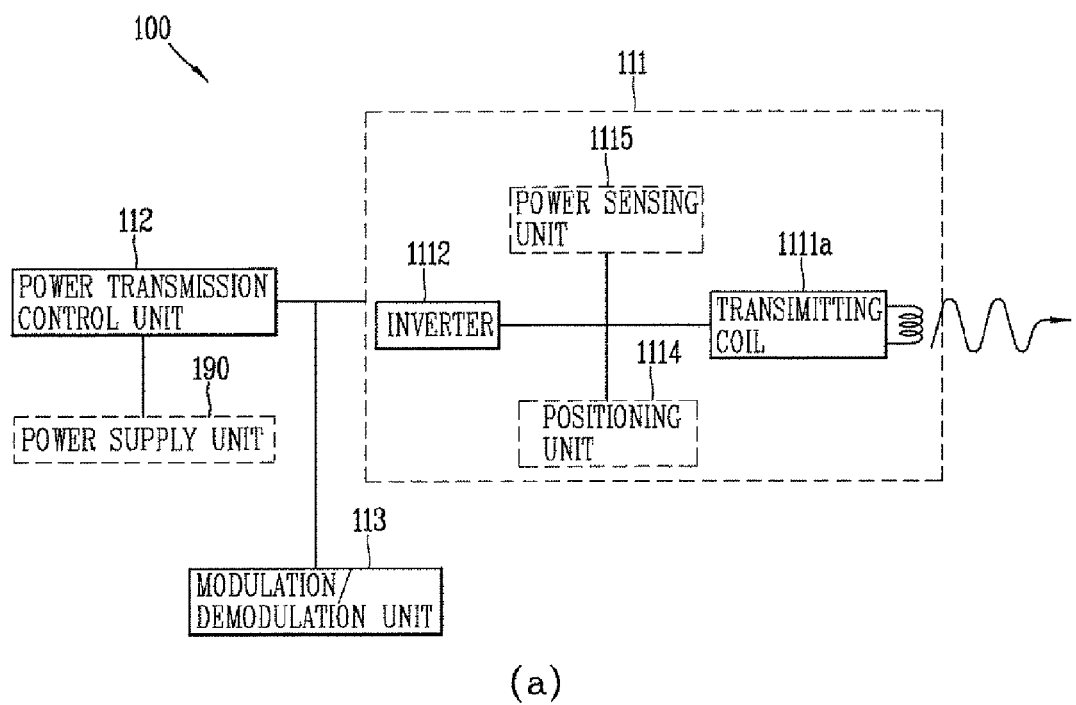
(a)
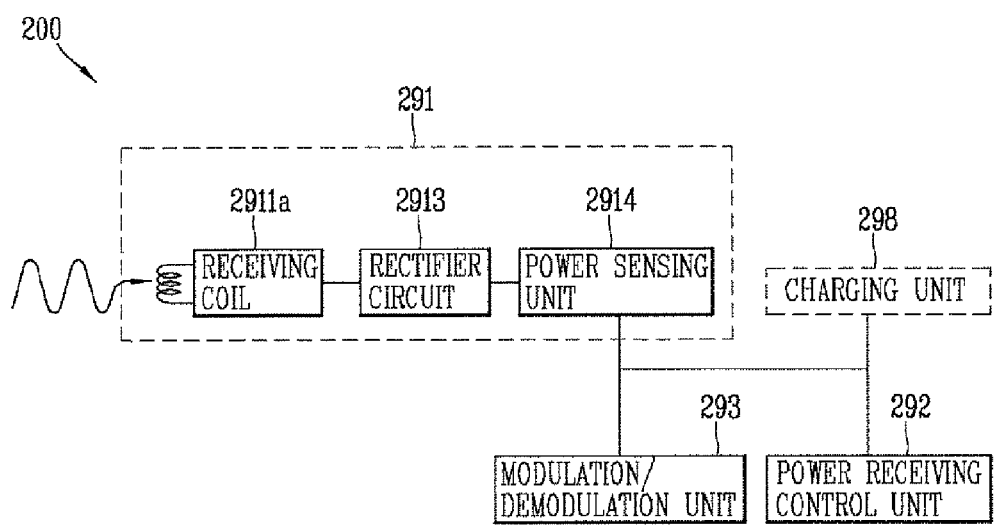
(b)

FIG. 13
(a) 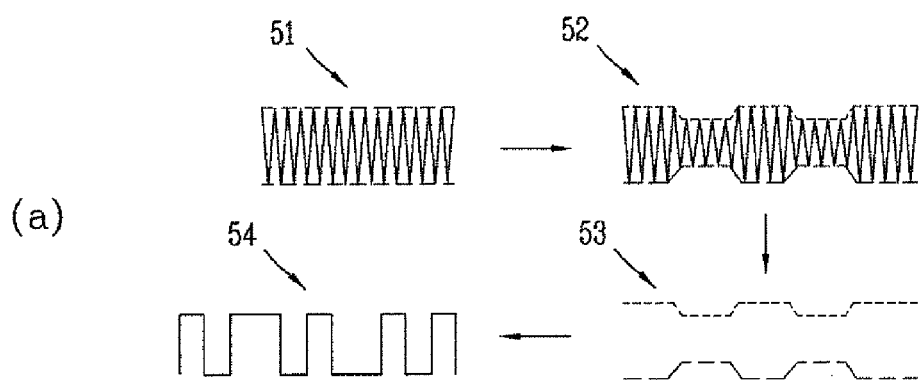
(b) 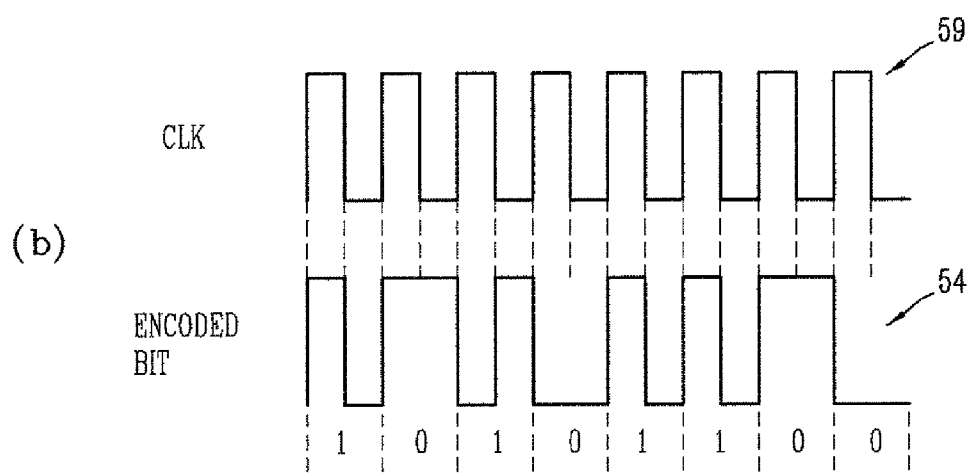
(c) 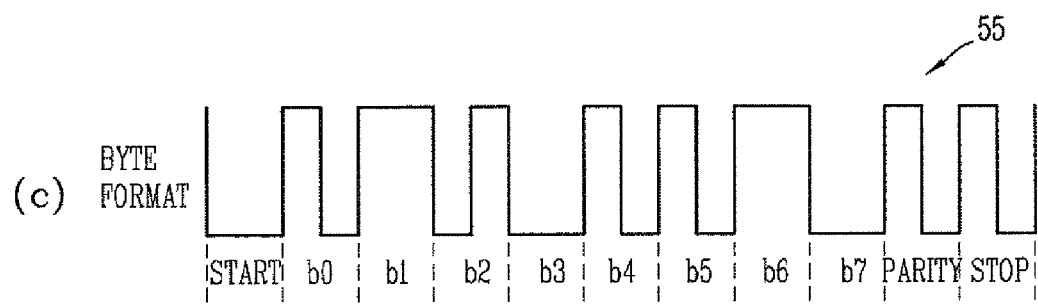

COMMUNICATION OF WIRELESS POWER RECEIVER THROUGH WIRELESS POWER SIGNAL

TECHNICAL FIELD

The present disclosure relates to a wireless power transfer, and more particularly, communication with a wireless power receiver through a wireless power signal.

BACKGROUND ART

In recent years, the method of contactlessly supplying electrical energy to wireless power receivers in a wireless manner has been used instead of the traditional method of supplying electrical energy in a wired manner. The wireless power receiver receiving energy in a wireless manner may be directly driven by the received wireless power, or a battery may be charged by using the received wireless power, then allowing the wireless power receiver to be driven by the charged power.

The Wireless Power Consortium (WPC) which manages technologies for a magnetic inductive wireless power transfer has published a standard document "System description Wireless Power Transfer, Volume 1, Low Power, Part 1: Interface Definition, Version 1.00 Release Candidate 1 (RC1)" for interoperability in the wireless power transfer on Apr. 22, 2010. The standard document of the WPC has described a method of transferring power from one wireless power transmitter to one wireless power receiver by a magnetic induction.

However, a wireless power signal which is generated by one wireless power transmitter to transfer power may be received by a plurality of wireless power receivers. Therefore, there is a need for a method, by which the plurality of wireless power receiver executes communication with the wireless power transmitter to control power transferred.

DISCLOSURE OF THE INVENTION

Therefore, to obviate those problems, an aspect of the detailed description is to provide a communication method of receivers, which receive power in a wireless manner, using a power transmission signal. Another aspect of this specification is to provide a communication method of at least one power receivers using a wireless power signal without collision. To this end, this specification proposes a method, by which a wireless power receiver, which enters an area allowing for a wireless power transfer, transmits a control message for the wireless power transfer.

To achieve these and other advantages and in accordance with the purpose of the present invention, as embodied and broadly described herein, there is provided a power receiver for transmitting a message using a power transmission signal, as one exemplary embodiment of the technology disclosed herein. The power receiver may include a power receiving unit that is configured to receive a wireless power signal generated by a power transmitter, a demodulation unit that is configured to demodulate the received wireless power signal, a modulation unit that is configured to modulate the received wireless power signal, and a controller that is configured to decode a first packet from the wireless power signal demodulated by the demodulation unit, determine whether or not a second packet is transmittable without collision with the decoded first packet, and control the modulation unit to modulate the received wireless power signal, in such a manner of including the second packet therein, when the second packet is transmittable according to the determination result.

The one exemplary embodiment or other embodiments may include at least one of the following features. The determination as to whether or not the second packet is transmittable may be carried out based on a transmission period of the first packet and a length of the decoded first packet. Also, the determination as to whether or not the second packet is transmittable may be carried out in such a manner that the transmission period of the first packet is compared with the sum of lengths of the decoded first packet and the second packet, and the second packet is determined as being transmittable when the transmission period of the first packet is greater than the sum of lengths according to the comparison result. The controller may modulate the received wireless power signal to include the second packet therein after the first packet is decoded, when the second packet is transmittable according to the determination result. The controller may modulate the received wireless power signal to include a packet indicating that the second packet is not transmittable after the first packet is decoded, when the second packet is not transmittable according to the determination result. The second packet may comprise an originator address, and the controller may decide an address, which is different from an originator address of the decoded first packet, as the originator address of the second packet. The second packet may include strength of the received wireless power signal, a frequency or power transmission state information. The power receiving unit may include a resonant circuit that is configured to generate a magnetic resonance in response to the received wireless power signal. The demodulation unit may demodulate the wireless power signal by acquiring the first packet from a current, generated due to the magnetic resonance generated in the resonant circuit. The modulation unit may modulate the wireless power signal by changing a load connected to the power receiver based on the second packet.

Meanwhile, there is provided a power transmitter, as another exemplary embodiment of the technology disclosed herein. The power transmitter may include a power conversion unit that is configured to generate a wireless power signal using power supplied from a power supply unit and receive a modulated wireless power signal, a demodulation unit that is configured to demodulate the received wireless power signal, and a controller that is configured to acquire an originator address of a packet and a control message by decoding the packet from the demodulated wireless power signal, decide a power characteristic value for a power receiver, which corresponds to the acquired originator address, based on the acquired control message, and adjust power supplied for the power receiver according to the decided power characteristic value.

There is provided a method for transmitting a control message, performed by a wireless power receiver to take part in communication using a power signal, as another exemplary embodiment of the technology disclosed herein. The method may include receiving a wireless power signal received by a coil, acquiring one or more packets based on a current generated in response to the received wireless power signal, decoding the acquired one or more packets, deciding a slot to be useable on the received wireless power signal without collision with the decoded packets, generating a response packet including originator information and a control message, and transmitting the response packet by changing a load connected to the coil in such a manner that the response packet is included in the decided slot of the wireless power signal.

The another exemplary embodiment or other embodiments may include at least one of the following features.

The useable slot may be decided as one of slots non-occupied by the one or more packets within a transmission period of the packets. The generating of the response packet may include checking originator information related to the decoded packets, and deciding identification information, which does not overlap the checked originator information, as the originator information related to the response packet.

There is provided a control method for a power transmitter which adjusts a wireless power transfer based on a wireless power signal modulated by one or more power receivers, as another exemplary embodiment of the technology disclosed herein. The control method may include generating a wireless power signal, receiving a modulated wireless power signal of a first period, acquiring packets belonging to the first period by demodulating the wireless power signal of the first period, and adjusting power supplied for generating the wireless power signal based on originator addresses and control messages of the packets belonging to the first period.

The another exemplary embodiment or other embodiments may include at least one of the following features.

The control method may further include receiving a modulated wireless power signal of a second period, acquiring packets belonging to the second period by demodulating the wireless power signal of the second period, comparing the originator addresses of the packets belonging to the first period with the originator addresses of the packets belonging to the second period, and changing a phase of the one or more power receivers based on the comparison result. The changing of the phase of the one or more power receivers may include carrying out an identification process with respect to a new power receiver when the new power receiver is detected according to the comparison result, wherein the detected new power receiver may be a power receiver corresponding to an originator address, which is not included in the packets acquired at the first period, among the originator addresses included in the packets acquired at the second period. Also, the changing of the phase of the one or more power receiver may include carrying out an identification process with respect to a new power receiver when the new power receiver is detected according to the comparison result, wherein the detected new power receiver may be a power receiver corresponding to a slot, which is not occupied by the packets acquired at the first period, among time slots occupied by the packets acquired at the second period.

Advantageous Effect

In accordance with the exemplary embodiments disclosed herein, a plurality of wireless power receivers, which receive power from a wireless power transmitter in a wireless manner, can transmit a power control message using a power transmission signal. Each of the plurality of wireless power receivers may control power, which is supplied thereto in the wireless manner, by transmitting the power control message to the wireless power transmitter.

BRIEF DESCRIPTION OF THE DRAWINGS

FIG. 4 is a block diagram illustrating part of the wireless power transmitter 100 and the electronic device 200 in a magnetic induction method that can be employed in the embodiments disclosed herein;

FIG. 13 is a view illustrating forms of signals upon modulation and demodulation executed in a wireless power transfer disclosed herein;

MODES FOR CARRYING OUT THE PREFERRED EMBODIMENTS

Figure 1:
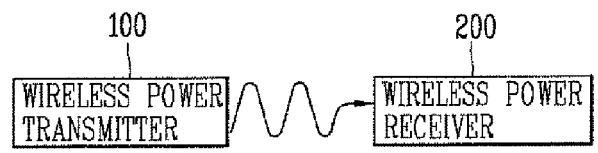
FIG. 1 is an exemplary view conceptually illustrating a wireless power transmitter and an electronic device according to the embodiments of the present invention.

The technologies disclosed herein may be applicable to wireless power transfer (contactless power transfer). However, the technologies disclosed herein are not limited to this, and may be also applicable to all kinds of power transmission systems and methods, wireless charging circuits and methods to which the technological spirit of the technology can be applicable, in addition to the methods and apparatuses using power transmitted in a wireless manner.

It should be noted that technological terms used herein are merely used to describe a specific embodiment, but not to limit the present invention. Also, unless particularly defined otherwise, technological terms used herein should be construed as a meaning that is generally understood by those having ordinary skill in the art to which the invention pertains, and should not be construed too broadly or too narrowly. Furthermore, if technological terms used herein are wrong terms unable to correctly express the spirit of the invention, then they should be replaced by technological terms that are properly understood by those skilled in the art. In addition, general terms used in this invention should be construed based on the definition of dictionary, or the context, and should not be construed too broadly or too narrowly.

Incidentally, unless clearly used otherwise, expressions in the singular number include a plural meaning. In this application, the terms "comprising" and "including" should not be construed to necessarily include all of the elements or steps disclosed herein, and should be construed not to include some of the elements or steps thereof, or should be construed to further include additional elements or steps.

In addition, a suffix "module" or "unit" used for constituent elements disclosed in the following description is merely intended for easy description of the specification, and the suffix itself does not give any special meaning or function.

Furthermore, the terms including an ordinal number such as first, second, etc. can be used to describe various elements, but the elements should not be limited by those terms. The terms are used merely for the purpose to distinguish an element from the other element. For example, a first element may be named to a second element, and similarly, a second element may be named to a first element without departing from the scope of right of the invention.

Hereinafter, preferred embodiments of the present invention will be described in detail with reference to the accompanying drawings, and the same or similar elements are designated with the same numeral references regardless of the numerals in the drawings and their redundant description will be omitted.

In describing the present invention, moreover, the detailed description will be omitted when a specific description for publicly known technologies to which the invention pertains is judged to obscure the gist of the present invention. Also, it should be noted that the accompanying drawings are merely illustrated to easily explain the spirit of the invention, and therefore, they should not be construed to limit the spirit of the invention by the accompanying drawings.

Conceptual View of Wireless Power Transmitter and Electronic Device

FIG. 1 FIG. 1 is an exemplary view conceptually illustrating a wireless power transmitter and an electronic device according to the embodiments of the present invention.

Referring to FIG. 1, the wireless power transmitter 100 may be a power transfer apparatus configured to transfer power required for the electronic device 200 in a wireless manner.

Furthermore, the wireless power transmitter 100 may be a wireless charging apparatus configured to charge a battery of the electronic device 200 by transferring power in a wireless manner. A case where the wireless power transmitter 100 is a wireless charging apparatus will be described later with reference to FIG. 9.

Additionally, the wireless power transmitter 100 may be implemented with various forms of apparatuses transferring power to the electronic device 200 requiring power in a contactless state.

The electronic device 200 is a device that is operable by receiving power from the wireless power transmitter 100 in a wireless manner. Furthermore, the electronic device 200 may charge a battery using the received wireless power.

On the other hand, an electronic device for receiving power in a wireless manner as described herein should be construed broadly to include a portable phone, a cellular phone, a smart phone, a personal digital assistant (PDA), a portable multimedia player (PMP), a tablet, a multimedia device, or the like, in addition to an input/output device such as a keyboard, a mouse, an audio-visual auxiliary device, and the like.

The wireless power receiver 200, as described later, may be a mobile communication terminal (for example, a portable phone, a cellular phone, and a tablet and the like) or a multimedia device. An exemplary embodiment in which the electronic device 200 is implemented as a mobile terminal will be described later with reference to FIG. 10.

On the other hand, the wireless power transmitter 100 may transfer power in a wireless manner without mutual contact to the electronic device 200 using one or more wireless power transfer methods. In other words, the wireless power transmitter 100 may transfer power using at least one of an inductive coupling method based on magnetic induction phenomenon by the wireless power signal and a magnetic resonance coupling method based on electromagnetic resonance phenomenon by a wireless power signal at a specific frequency.

Wireless power transfer in the inductive coupling method is a technology transferring power in a wireless manner using a primary coil and a secondary coil, and refers to the transmission of power by inducing a current from a coil to another coil through a changing magnetic field by a magnetic induction phenomenon.

Wireless power transfer in the inductive coupling method refers to a technology in which the electronic device 200 generates resonance by a wireless power signal transmitted from the wireless power transmitter 100 to transfer power from the wireless power transmitter 100 to the electronic device 200 by the resonance phenomenon.

Hereinafter, the wireless power transmitter 100 and the electronic device 200 according to the embodiments disclosed herein will be described in detail. In assigning reference numerals to the constituent elements in each of the following drawings, the same reference numerals will be used for the same constituent elements even though they are shown in a different drawing.

Figure 2:
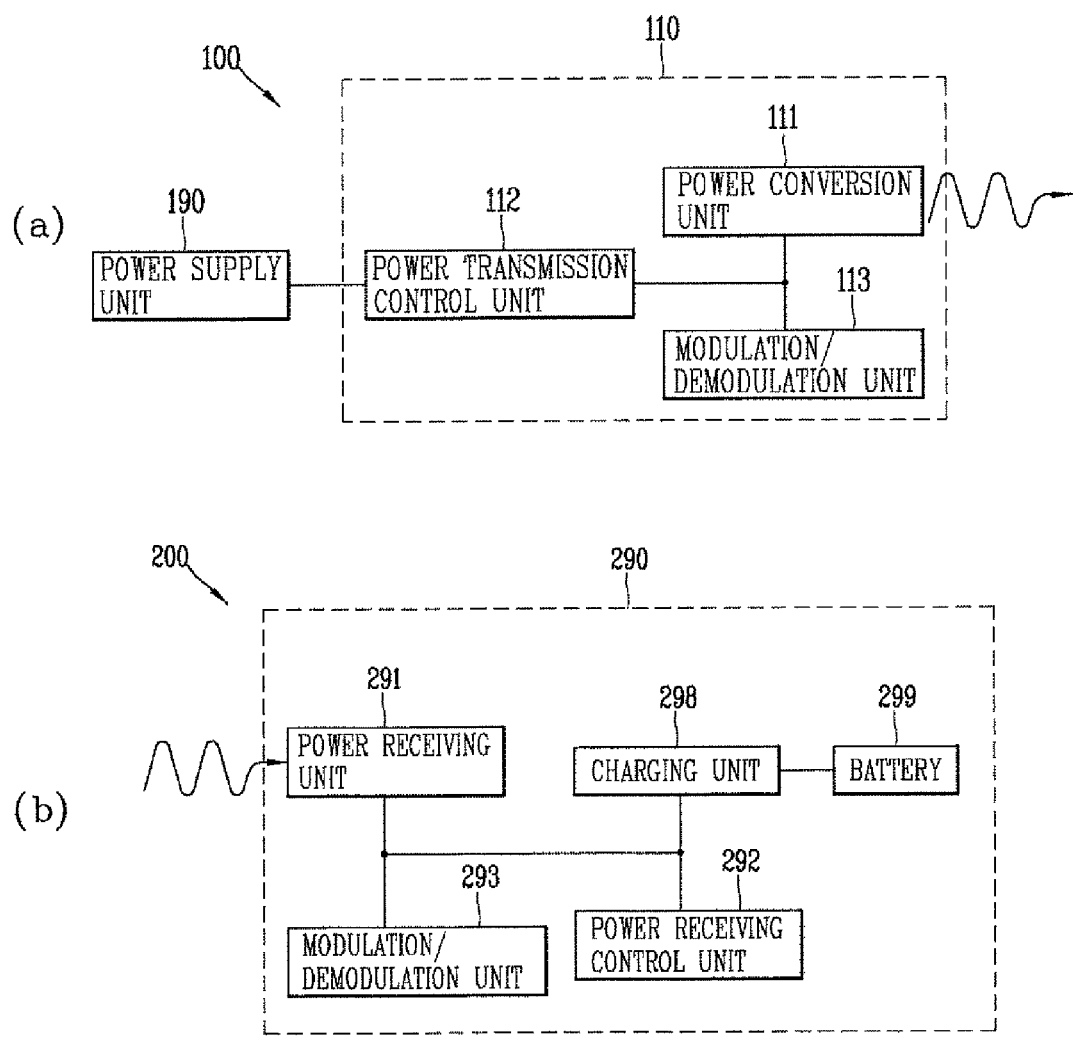
FIGS. 2A and 2B are exemplary block diagrams illustrating the configuration of a wireless power transmitter 100 and an electronic device 200 that can be employed in the embodiments disclosed herein, respectively.

FIG. 2 is an exemplary block diagram illustrating the configuration of a wireless power transmitter 100 and an electronic device 200 that can be employed in the embodiments disclosed herein.

Wireless Power Transmitter

Referring to FIG. 2A, the wireless power transmitter 100 may include a power transmission unit 110. The power transmission unit 110 may include a power conversion unit 111 and a power transmission control unit 112.

The power conversion unit 111 transfers power supplied from a transmission side power supply unit 190 to the electronic device 200 by converting it into a wireless power signal. The wireless power signal transferred by the power conversion unit 111 is generated in the form of a magnetic field or electro-magnetic field having an oscillation characteristic. For this purpose, the power conversion unit 111 may be configured to include a coil for generating the wireless power signal.

The power conversion unit 111 may include a constituent element for generating a different type of wireless power signal according to each power transfer method.

For example, the power conversion unit 111 may include a primary coil for forming a changing magnetic field to induce a current to a secondary coil of the electronic device 200. Furthermore, the power conversion unit 111 may include a coil (or antenna) for forming a magnetic field having a specific resonant frequency to generate a resonant frequency in the electronic device 200 according to the resonance coupling method.

Furthermore, the power conversion unit 111 may transfer power using at least one of the foregoing inductive coupling method and the resonance coupling method.

Among the constituent elements included in the power conversion unit 111, those for the inductive coupling method will be described later with reference to FIGS. 4 and 5, and those for the resonance coupling method will be described with reference to FIGS. 7 and 8.

On the other hand, the power conversion unit 111 may further include a circuit for controlling the characteristics of a used frequency, an applied voltage, an applied current or the like to form the wireless power signal.

The power transmission control unit 112 controls each of the constituent elements included in the power transmission unit 110. The power transmission control unit 112 may be implemented to be integrated into another control unit (not shown) for controlling the wireless power transmitter 100.

On the other hand, a region which the wireless power signal can be approached may be divided into two types. First, an active area denotes a region through which a wireless power signal transferring power to the electronic device 200 is passed. Next, a semi-active area denotes an interest region in which the wireless power transmitter 100 can detect the existence of the electronic device 200. Here, the power transmission control unit 112 may detect whether the electronic device 200 is placed in the active area or detection area or removed from the area. Specifically, the power transmission control unit 112 may detect whether or not the electronic device 200 is placed in the active area or detection area using a wireless power signal formed from the power conversion unit 111 or a sensor separately provided therein. For instance, the power transmission control unit 112 may detect the presence of the electronic device 200 by monitoring whether or not the characteristic of power for forming the wireless power signal is changed by the wireless power signal, which is affected by the electronic device 200 existing in the detection area. However, the active area and detection area may vary according to the wireless power transfer method such as an inductive coupling method, a resonance coupling method, and the like.

The power transmission control unit 112 may perform the process of identifying the electronic device 200 or determine whether to start wireless power transfer according to a result of detecting the existence of the electronic device 200.

Furthermore, the power transmission control unit 112 may determine at least one characteristic of a frequency, a voltage, and a current of the power conversion unit 111 for forming the wireless power signal.

The power transmission control unit 112 may receive a power control message from the electronic device 200. The power transmission control unit 112 may acquire information related to power transferred in a wireless manner to the electronic device 200 based on the received power control message. Also, the power transmission control unit 112 may acquire control information for controlling power transfer based on the received power control message. The wireless power transmitter 100 may start or end a transmission of a wireless power signal based on the power control message. The wireless power transmitter 100 may control the characteristic of the wireless power signal based on the power control message.

The power transmission control unit 112 included in the wireless power transmitter according to the exemplary embodiments disclosed herein may receive the power control message through the wireless power signal.

In order to receive the foregoing power control message, the wireless power transmitter 100 may further include a modulation/demodulation unit 113 electrically connected to the power conversion unit 111. The modulation/demodulation unit 113 may modulate a wireless power signal that has been modulated by the electronic device 200 and use it to receive the power control message. A method in which the power conversion unit 111 receives the power control message using the wireless power signal will be described later with reference to FIGS. 11 to 14.

Electronic Device

Referring to FIG. 2B, the electronic device 200 may include a power supply unit 290. The power supply unit 290 supplies power required for the operation of the wireless power receiver 200. The power supply unit 290 may include a power receiving unit 291 and a power reception control unit 292.

The power receiving unit 291 receives power transferred from the wireless power transmitter 100 in a wireless manner.

The power receiving unit 291 may include constituent elements required to receive the wireless power signal according to a wireless power transfer method. Furthermore, the power receiving unit 291 may receive power according to at least one wireless power transfer method, and in this case, the power receiving unit 291 may include constituent elements required for each method.

First, the power receiving unit 291 may include a coil for receiving a wireless power signal transferred in the form of a magnetic field or electromagnetic field having a vibration characteristic.

For instance, as a constituent element according to the inductive coupling method, the power receiving unit 291 may include a secondary coil to which a current is induced by a changing magnetic field. In exemplary embodiments, the power receiving unit 291, as a constituent element according to the resonance coupling method, may include a coil and a resonant circuit in which resonance phenomenon is generated by a magnetic field having a specific resonant frequency.

In another exemplary embodiments, when the power receiving unit 291 receives power according to at least one wireless power transfer method, the power receiving unit 291 may be implemented to receive power by using a coil, or implemented to receive power by using a coil formed differently according to each power transfer method.

Among the constituent elements included in the power receiving unit 291, those for the inductive coupling method will be described later with reference to FIG. 4, and those for the resonance coupling method with reference to FIG. 7.

On the other hand, the power receiving unit 291 may further include a rectifier and a regulator to convert the wireless power signal into a direct current. Furthermore, the power receiving unit 291 may further include a circuit for protecting an overvoltage or overcurrent from being generated by the received power signal.

The power reception control unit 292 may control each constituent element included in the power supply unit 290.

Specifically, the power reception control unit 292 may transfer a power control message to the wireless power transmitter 100. The power control message may instruct the wireless power transmitter 100 to initiate or terminate a transfer of the wireless power signal. Furthermore, the power control message may instruct the wireless power transmitter 100 to control a characteristic of the wireless power signal. However, the type of power control message may not be limited to being transferred for the aforementioned purpose.

In exemplary embodiments, the power reception control unit 292 may transmit the power control message through the wireless power signal.

In order to transmit the power control message through the wireless power signal, the electronic device 200 may further include a modulation/demodulation unit 293 electrically connected to the power receiving unit 291. The modulation/demodulation unit 293, similarly to the case of the wireless power transmitter 100, may be used to transmit the power control message through the wireless power signal. The power communications modulation/demodulation unit 293 may be used as a means for controlling a current and/or voltage flowing through the power conversion unit 111 of the wireless power transmitter 100. Hereinafter, a method for allowing the modulation/demodulation unit 113 or 293 at the side of the wireless power transmitter 100 and at the side of the electronic device 200, respectively, to be used to transmit and receive a power control message through a wireless power signal will be described.

A wireless power signal formed by the power conversion unit 111 is received by the power receiving unit 291. At this time, the power reception control unit 292 controls the modulation/demodulation unit 293 at the side of the electronic device 200 to modulate the wireless power signal. For instance, the power reception control unit 292 may perform a modulation process such that a power amount received from the wireless power signal is varied by changing a reactance of the modulation/demodulation unit 293 connected to the power receiving unit 291. The change of a power amount received from the wireless power signal results in the change of a current and/or voltage of the power conversion unit 111 for forming the wireless power signal. At this time, the modulation/demodulation unit 113 at the side of the wireless power transmitter 100 may detect a change of the current and/or voltage to perform a demodulation process.

In other words, the power reception control unit 292 may generate a packet including a power control message intended to be transferred to the wireless power transmitter 100 and modulate the wireless power signal to allow the packet to be included therein, and the power transmission control unit 112 may decode the packet based on a result of performing the demodulation process of the modulation/demodulation unit 113 to acquire the power control message included in the packet. A detailed method in which the wireless power transmitter 100 acquires the power control message will be described later with reference to FIGS. 11 to 14.

In addition, the power supply unit 290 may further include a charger 298 and a battery 299.

The wireless power receiver 200 receiving power for operation from the power supply unit 290 may be operated by power transferred from the wireless power transmitter 100, or operated by charging the battery 299 using the transferred power and then receiving the charged power. At this time, the power reception control unit 292 may control the charger 298 to perform charging using the transferred power.

Hereinafter, description will be given of a wireless power transmitter and an electronic device applicable to the exemplary embodiments disclosed herein.

First, a method of allowing the wireless power transmitter to transfer power to the electronic device according to the inductive coupling method will be described with reference to FIGS. 3 through 5.

Inductive Coupling Method

Figure 3:
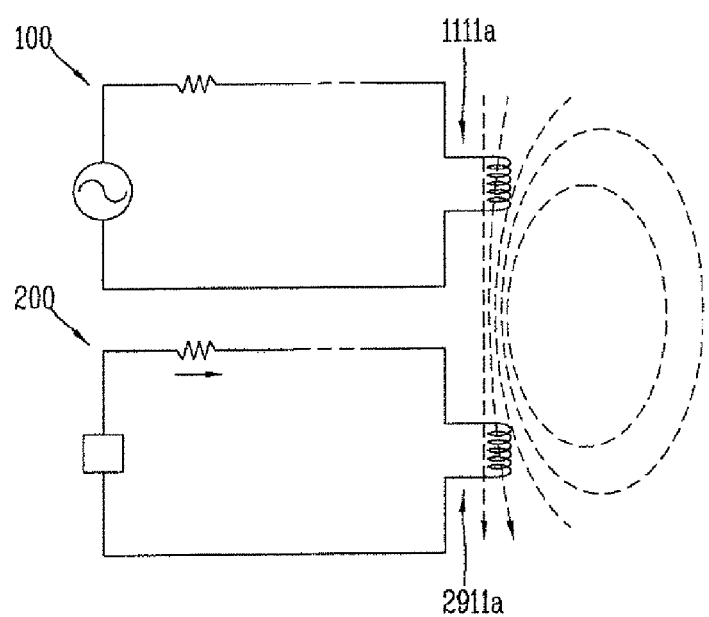
FIG. 3 is a view illustrating a concept in which power is transferred from a wireless power transmitter 100 to an electronic device 200 in a wireless manner according to an inductive coupling method.

FIG. 3 is a view illustrating a concept in which power is transferred from a wireless power transmitter to an electronic device in a wireless manner according to an inductive coupling method.

When the power of the wireless power transmitter 100 is transferred in an inductive coupling method, if the strength of a current flowing through a primary coil within the power transmission unit 110 is changed, then a magnetic field passing through the primary coil will be changed by the current. The changed magnetic field generates an induced electromotive force at a secondary coil in the electronic device 200.

According to the foregoing method, the power conversion unit 111 of the wireless power transmitter 100 may include a transmitting (Tx) coil 1111a being operated as a primary coil in magnetic induction. Furthermore, the power receiving unit 291 of the electronic device 200 may include a receiving (Rx) coil 2911a being operated as a secondary coil in magnetic induction.

First, the wireless power transmitter 100 and the electronic device 200 are disposed in such a manner that the transmitting coil 1111a at the side of the wireless power transmitter 100 and the receiving coil at the side of the electronic device 200 are located adjacent to each other. Then, if the power transmission control unit 112 controls a current of the transmitting coil (Tx coil) 1111a to be changed, then the power receiving unit 291 controls power to be supplied to the electronic device 200 using an electromotive force induced to the receiving coil (Rx coil) 2911a.

The efficiency of wireless power transfer by the inductive coupling method may be little affected by a frequency characteristic, but affected by an alignment and distance between the wireless power transmitter 100 and the electronic device 200 including each coil.

On the other hand, in order to perform wireless power transfer in the inductive coupling method, the wireless power transmitter 100 may be configured to include an interface surface (not shown) in the form of a flat surface. One or more electronic devices may be placed at an upper portion of the interface surface, and the transmitting coil 1111a may be mounted at a lower portion of the interface surface. In this case, a vertical spacing is formed in a small-scale between the transmitting coil 1111a mounted at a lower portion of the interface surface and the receiving coil 2911a of the electronic device 200 placed at an upper portion of the interface surface, and thus a distance between the coils becomes sufficiently small to efficiently implement contactless power transfer by the inductive coupling method.

Furthermore, an alignment indicator (not shown) indicating a location where the electronic device 200 is to be placed at an upper portion of the interface surface. The alignment indicator indicates a location of the electronic device 200 where an alignment between the transmitting coil 1111a mounted at a lower portion of the interface surface and the receiving coil 2911a can be suitably implemented. The alignment indicator may alternatively be simple marks, or may be formed in the form of a protrusion structure for guiding the location of the electronic device 200. Otherwise, the alignment indicator may be formed in the form of a magnetic body such as a magnet mounted at a lower portion of the interface surface, thereby guiding the coils to be suitably arranged by mutual magnetism to a magnetic body having an opposite polarity mounted within the electronic device 200.

On the other hand, the wireless power transmitter 100 may be formed to include one or more transmitting coils. The wireless power transmitter 100 may selectively use some of coils suitably arranged with the receiving coil 2911*a* of the electronic device 200 among the one or more transmitting coils to enhance the power transmission efficiency. The wireless power transmitter 100 including the one or more transmitting coils will be described later with reference to FIG. 5.

Hereinafter, configurations of the wireless power transmitter and electronic device using an inductive coupling method applicable to the embodiments disclosed herein will be described in detail.

Wireless Power Transmitter and Electronic Device in Inductive Coupling Method

FIG. 4 is a block diagram illustrating part of the wireless power transmitter 100 and the electronic device 200 in a magnetic induction method that can be employed in the embodiments disclosed herein. A configuration of the power transmission unit 110 included in the wireless power transmitter 100 will be described with reference to FIG. 4A, and a configuration of the power supply unit 290 included in the electronic device 200 will be described with reference to FIG. 4B.

Referring to FIG. 4A, the power conversion unit 111 of the wireless power transmitter 100 may include a transmitting (Tx) coil 1111*a* and an inverter 1112.

The transmitting coil 1111*a* may form a magnetic field corresponding to the wireless power signal according to a change of current as described above. The transmitting coil 1111*a* may alternatively be implemented with a planar spiral type or cylindrical solenoid type.

The inverter 1112 transforms a DC input obtained from the power supply unit 190 into an AC waveform. The AC current transformed by the inverter 1112 drives a resonant circuit including the transmitting coil 1111*a* and a capacitor (not shown) to form a magnetic field in the transmitting coil 1111*a*.

In addition, the power conversion unit 111 may further include a positioning unit 1114.

The positioning unit 1114 may move or rotate the transmitting coil 1111*a* to enhance the effectiveness of contactless power transfer using the inductive coupling method. As described above, it is because an alignment and distance between the wireless power transmitter 100 and the electronic device 200 including a primary coil and a secondary coil may affect power transfer using the inductive coupling method. In particular, the positioning unit 1114 may be used when the electronic device 200 does not exist within an active area of the wireless power transmitter 100.

Accordingly, the positioning unit 1114 may include a drive unit (not shown) for moving the transmitting coil 1111*a* such that a center-to-center distance of the transmitting coil 1111*a* of the wireless power transmitter 100 and the receiving coil 2911*a* of the electronic device 200 is within a predetermined range, or rotating the transmitting coil 1111*a* such that the centers of the transmitting coil 1111*a* and the receiving coil 2911*a* are overlapped with each other.

For this purpose, the wireless power transmitter 100 may further include a detection unit (not shown) made of a sensor for detecting the location of the electronic device 200, and the power transmission control unit 112 may control the positioning unit 1114 based on the location information of the electronic device 200 received from the location detection sensor.

Furthermore, to this end, the power transmission control unit 112 may receive control information on an alignment or distance to the electronic device 200 through the power communications modulation/demodulation unit 113, and control the positioning unit 1114 based on the received control information on the alignment or distance.

If the power conversion unit 111 is configured to include a plurality of transmitting coils, then the positioning unit 1114 may determine which one of the plurality of transmitting coils is to be used for power transmission. The configuration of the wireless power transmitter 100 including the plurality of transmitting coils will be described later with reference to FIG. 5.

On the other hand, the power conversion unit 111 may further include a power sensing unit 1115. The power sensing unit 1115 at the side of the wireless power transmitter 100 monitors a current or voltage flowing into the transmitting coil 1111*a*. The power sensing unit 1115 is provided to check whether or not the wireless power transmitter 100 is normally operated, and thus the power sensing unit 1115 may detect a voltage or current of the power supplied from the outside, and check whether the detected voltage or current exceeds a threshold value. The power sensing unit 1115, although not shown, may include a resistor for detecting a voltage or current of the power supplied from the outside and a comparator for comparing a voltage value or current value of the detected power with a threshold value to output the comparison result. Based on the check result of the power sensing unit 1115, the power transmission control unit 112 may control a switching unit (not shown) to cut off power applied to the transmitting coil 1111*a*.

Referring to FIG. 4B, the power supply unit 290 of the electronic device 200 may include a receiving (Rx) coil 2911*a* and a rectifier 2913.

A current is induced into the receiving coil 2911*a* by a change of the magnetic field formed in the transmitting coil 1111*a*. The implementation type of the receiving coil 2911*a* may be a planar spiral type or cylindrical solenoid type similarly to the transmitting coil 1111*a*.

Furthermore, series and parallel capacitors may be configured to be connected to the receiving coil 2911*a* to enhance the effectiveness of wireless power reception or perform resonant detection.

The receiving coil 2911*a* may be in the form of a single coil or a plurality of coils.

The rectifier 2913 performs a full-wave rectification to a current to convert alternating current into direct current. The rectifier 2913, for instance, may be implemented with a full-bridge rectifier made of four diodes or a circuit using active components.

In addition, the rectifier 2913 may further include a regulator for converting a rectified current into a more flat and stable direct current. Furthermore, the output power of the rectifier 2913 is supplied to each constituent element of the power supply unit 290. Furthermore, the rectifier 2913 may further include a DC-DC converter for converting output DC power into a suitable voltage to adjust it to the power required for each constituent element (for instance, a circuit such as a charger 298).

The modulation/demodulation unit 293 may be connected to the power receiving unit 291, and may be configured with a resistive element in which resistance varies with respect to direct current, and may be configured with a capacitive element in which reactance varies with respect to alternating current. The power reception control unit 292 may change the resistance or reactance of the modulation/demodulation unit 293 to modulate a wireless power signal received to the power receiving unit 291.

On the other hand, the power supply unit 290 may further include a power sensing unit 2914. The power sensing unit 2914 at the side of the electronic device 200 monitors a voltage and/or current of the power rectified by the rectifier 2913, and if the voltage and/or current of the rectified power exceeds a threshold value as a result of monitoring, then the power reception control unit 292 transmits a power control message to the wireless power transmitter 100 to transfer suitable power.

Wireless Power Transmitter Including One or More Transmitting Coils

Figure 5:
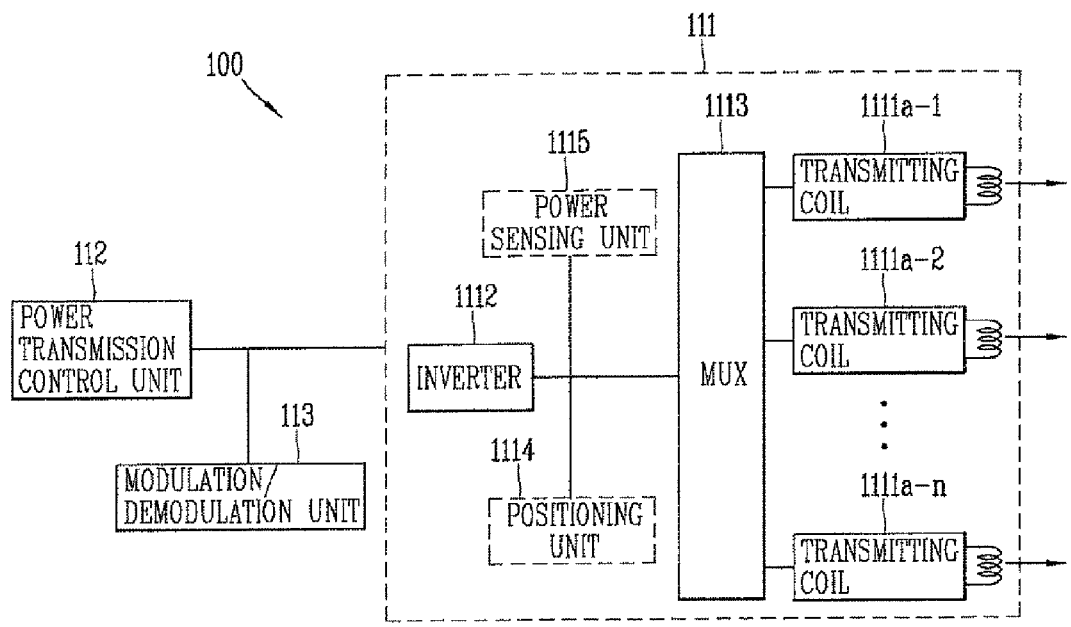
FIG. 5 is a block diagram illustrating a wireless power transmitter configured to have one or more transmitting coils receiving power according to an inductive coupling method that can be employed in the embodiments disclosed herein.

FIG. 5 is a block diagram illustrating a wireless power transmitter configured to have one or more transmission coils receiving power according to an inductive coupling method that can be employed in the embodiments disclosed herein.

Referring to FIG. 5, the power conversion unit 111 of the wireless power transmitter 100 according to the embodiments disclosed herein may include one or more transmitting coils 1111a-1 to 1111a-n. The one or more transmitting coils 1111a-1 to 1111a-n may be an array of partly overlapping primary coils. An active area may be determined by some of the one or more transmitting coils.

The one or more transmitting coils 1111a-1 to 1111a-n may be mounted at a lower portion of the interface surface. Furthermore, the power conversion unit 111 may further include a multiplexer 1113 for establishing and releasing the connection of some of the one or more transmitting coils 1111a-1 to 1111a-n.

Upon detecting the location of the electronic device 200 placed at an upper portion of the interface surface, the power transmission control unit 112 may take the detected location of the electronic device 200 into consideration to control the multiplexer 1113, thereby allowing coils that can be placed in an inductive coupling relation to the receiving coil 2911a of the electronic device 200 among the one or more transmitting coils 1111a-1 to 1111a-n to be connected to one another.

For this purpose, the power transmission control unit 112 may acquire the location information of the electronic device 200. For example, the power transmission control unit 112 may acquire the location of the electronic device 200 on the interface surface by the location detection unit (not shown) provided in the wireless power transmitter 100. For another example, the power transmission control unit 112 may alternatively receive a power control message indicating a strength of the wireless power signal from an object on the interface surface or a power control message indicating the identification information of the object using the one or more transmitting coils 1111a-1 to 1111a-n, respectively, and determines whether it is located adjacent to which one of the one or more transmitting coils based on the received result, thereby acquiring the location information of the electronic device 200.

On the other hand, the active area as part of the interface surface may denote a portion through which a magnetic field with a high efficiency can pass when the wireless power transmitter 100 transfers power to the wireless power receiver 200 in a wireless manner. At this time, a single transmitting coil or one or a combination of more transmitting coils forming a magnetic field passing through the active area may be designated as a primary cell. Accordingly, the power transmission control unit 112 may determine an active area based on the detected location of the wireless power receiver 200, and establish the connection of a primary cell corresponding to the active area to control the multiplexer 1113, thereby allowing the receiving coil 2911a of the wireless power receiver 200 and the coils belonging to the primary cell to be placed in an inductive coupling relation.

On the other hand, when at least one electronic device 200 is arranged on the interface surface of the wireless power transmitter 100 having the one or more transmitting coils 1111a-1 to 1111a-n, the power transmission control unit 112 may control the multiplexer 1113, thereby allowing the coils belonging to the primary cell corresponding to a position of each electronic device to be placed in the inductive coupling relation. Accordingly, the wireless power transmitter 100 may generate a wireless power signal using different coils and transfer power to the at least one electronic device in a wireless manner.

Also, the power transmission control unit 112 may set power with different characteristics to be supplied to the coils corresponding to the electronic devices. In this case, the wireless power transmitter 100 may transfer power by setting a power transfer method, efficiency, a characteristic and the like on the electronic device basis. The power transfer for at least one electronic device will be described later with reference to FIG. 28.

On the other hand, the power conversion unit 111 may further include an impedance matching unit (not shown) for adjusting impedance to make a resonant circuit together with the coils connected.

Hereinafter, a method for allowing a wireless power transmitter to transfer power according to a resonance coupling method will be described with reference to FIGS. 6 to 8.

Resonance Coupling Method

Figure 6:
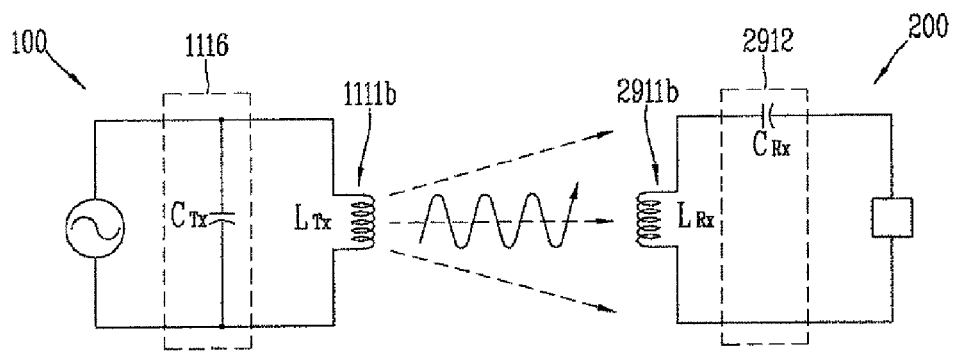
FIG. 6 is a view illustrating a concept in which power is transferred to an electronic device from a wireless power transmitter in a wireless manner according to a resonance coupling method.

FIG. 6 is a view illustrating a concept in which power is transferred to an electronic device from a wireless power transmitter in a wireless manner according to a resonance coupling method.

First, resonance will be described in brief as follows. Resonance refers to a phenomenon in which amplitude of vibration is remarkably increased when periodically receiving an external force having the same frequency as the natural frequency of a vibration system. Resonance is a phenomenon occurring at all kinds of vibrations such as mechanical vibration, electric vibration, and the like. Generally, when exerting a vibratory force to a vibration system from the outside, if the natural frequency thereof is the same as a frequency of the externally applied force, then the vibration becomes strong, thus increasing the width.

With the same principle, when a plurality of vibrating bodies separated from one another within a predetermined distance vibrate at the same frequency, the plurality of vibrating bodies resonate with one another, and in this case, resulting in a reduced resistance between the plurality of vibrating bodies. In an electrical circuit, a resonant circuit can be made by using an inductor and a capacitor.

When the wireless power transmitter 100 transfers power according to the resonance coupling method, a magnetic field having a specific vibration frequency is formed by alternating current power in the power transmission unit 110. If a resonance phenomenon occurs in the wireless power receiver 200 by the formed magnetic field, then power is generated by the resonance phenomenon in the electronic device 200.

If the plurality of vibrating bodies resonate with each other in an electromagnetic manner as aforementioned, extremely high power transmission efficiency may be exhibited due to non affection by adjacent objects except for the vibrating bodies. An energy tunnel may be generated between the plurality of vibrating bodies which resonate with each other in the electromagnetic manner. This may be referred to as energy coupling or energy tail.

The resonance coupling disclosed herein may use an electromagnetic wave having a low frequency. When power is transferred using the electromagnetic wave having the low frequency, only a magnetic field may affect an area located within a single wavelength of the electromagnetic wave. This phenomenon may be referred to as magnetic coupling or magnetic resonance. The magnetic resonance may be generated when the wireless power transmitter 100 and the electronic device 200 are located within the single wavelength of the electromagnetic wave having the low frequency.

Here, in general, human bodies are sensitive to an electric field but tolerant to a magnetic field. Hence, when power is transferred using a magnetic resonance, the human bodies may be badly affected due to being exposed to the electromagnetic wave. Also, as the energy tail is generated in response to the resonance phenomenon, the form of power transmission may exhibit a non-radiative property. Consequently, upon transferring power using such electromagnetic wave, a radiative problem which occurs frequently may be solved.

The resonance coupling method may be a method for transferring power using the electromagnetic wave with the low frequency, as aforementioned. Thus, the transmitting coil 1111b of the wireless power transmitter 100 may form a magnetic field or electromagnetic wave for transferring power in principle. However, the resonance coupling method will be described hereinafter from the perspective of a magnetic resonance, namely, a power transmission by a magnetic field.

The resonant frequency may be determined by the following formula in Equation 1.

$$f = \frac{1}{2\pi\sqrt{LC}} \quad \text{[Equation 1]}$$

Here, the resonant frequency (f) is determined by an inductance (L) and a capacitance (C) in a circuit. In a circuit forming a magnetic field using a coil, the inductance can be determined by a number of turns of the coil, and the like, and the capacitance can be determined by a gap between the coils, an area, and the like. In addition to the coil, a capacitive resonant circuit may be configured to be connected thereto to determine the resonant frequency.

Referring to FIG. 6, when power is transmitted in a wireless manner according to the resonance coupling method, the power conversion unit 111 of the wireless power transmitter 100 may include a transmitting (Tx) coil 1111b in which a magnetic field is formed and a resonant circuit (or RESONANT GENERATION CIRCUIT) 1116 connected to the transmitting coil 1111b to determine a specific vibration frequency. The resonant circuit 1116 may be implemented by using a capacitive circuit (capacitors), and the specific vibration frequency may be determined based on an inductance of the transmitting coil 1111b and a capacitance of the resonant circuit 1116.

The configuration of a circuit element of the resonant circuit 1116 may be implemented in various forms such that the power conversion unit 111 forms a magnetic field, and is not limited to a form of being connected in parallel to the transmitting coil 1111b as illustrated in FIG. 6.

Furthermore, the power receiving unit 291 of the electronic device 200 may include a resonant circuit 2912 and a receiving (Rx) coil 2911b to generate a resonance phenomenon by a magnetic field formed in the wireless power transmitter 100. In other words, the resonant circuit 2912 may be also implemented by using a capacitive circuit, and the resonant circuit 2912 is configured such that a resonant frequency determined based on an inductance of the receiving coil 2911b and a capacitance of the resonant circuit 2912 has the same frequency as a resonant frequency of the formed magnetic field.

The configuration of a circuit element of the resonant circuit 2912 may be implemented in various forms such that the power receiving unit 291 generates resonance by a magnetic field, and is not limited to a form of being connected in series to the receiving coil 2911b as illustrated in FIG. 6.

The specific vibration frequency in the wireless power transmitter 100 may have $L_{TX}$, $C_{TX}$, and may be acquired by using the Equation 1. Here, the electronic device 200 generates resonance when a result of substituting the $L_{RX}$ and $C_{RX}$ of the electronic device 200 to the Equation 1 is same as the specific vibration frequency.

According to a contactless power transfer method by resonance coupling, when the wireless power transmitter 100 and electronic device 200 resonate at the same frequency, respectively, an electromagnetic wave is propagated through a short-range magnetic field, and thus there exists no energy transfer between the devices if they have different frequencies.

As a result, an efficiency of contactless power transfer by the resonance coupling method is greatly affected by a frequency characteristic, whereas the effect of an alignment and distance between the wireless power transmitter 100 and the electronic device 200 including each coil is relatively smaller than the inductive coupling method.

Hereinafter, the configuration of a wireless power transmitter and an electronic device in the resonance coupling method applicable to the embodiments disclosed herein will be described in detail.

Wireless Power Transmitter in Resonance Coupling Method

Figure 7:
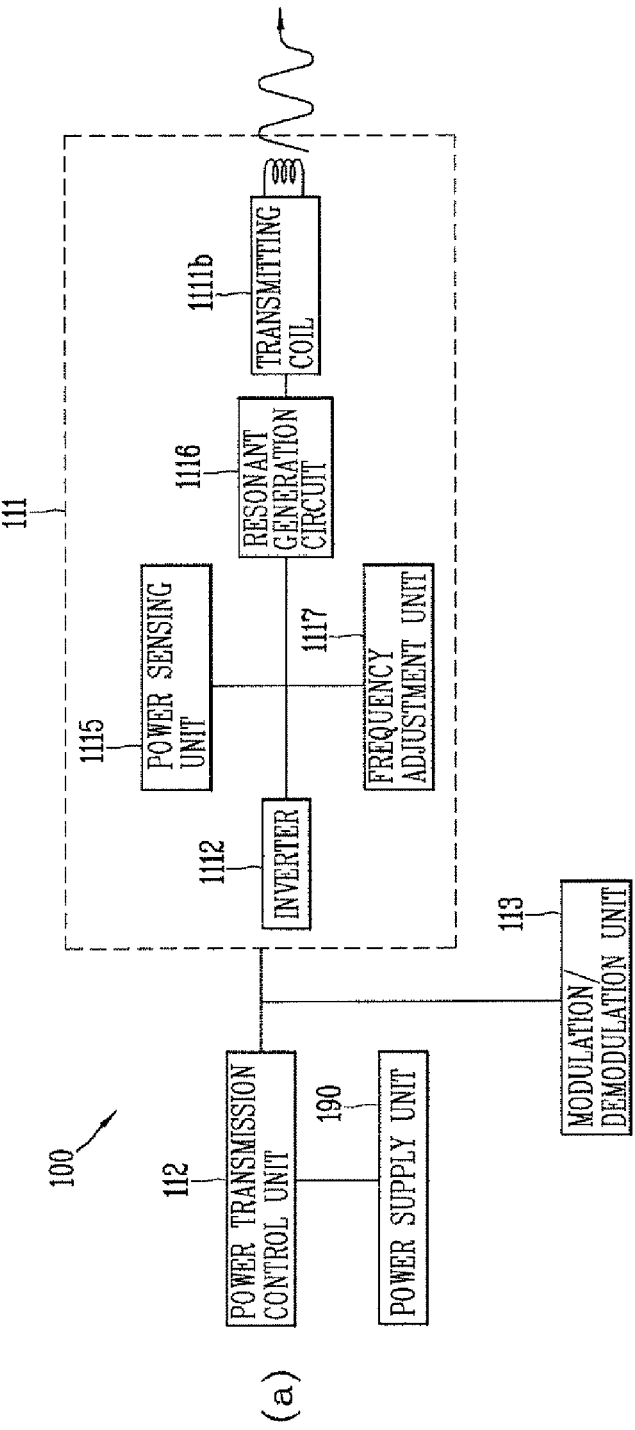
FIG. 7 is a block diagram illustrating part of the wireless power transmitter 100 and the electronic device 200 in a resonance method that can be employed in the embodiments disclosed herein.
Figure 7:
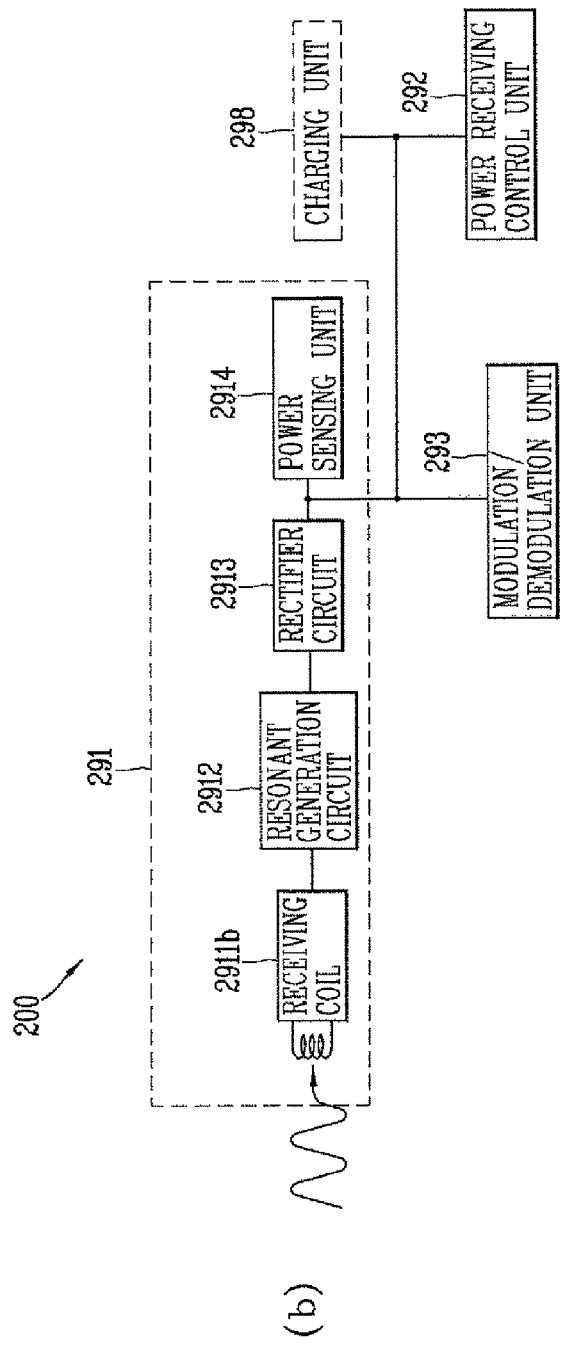

FIG. 7 is a block diagram illustrating part of the wireless power transmitter 100 and the electronic device 200 in a resonance method that can be employed in the embodiments disclosed herein.

A configuration of the power transmission unit 110 included in the wireless power transmitter 100 will be described with reference to FIG. 7A.

The power conversion unit 111 of the wireless power transmitter 100 may include a transmitting (Tx) coil 1111b, an inverter 1112, and a resonant circuit 1116. The inverter 1112 may be configured to be connected to the transmitting coil 1111b and the resonant circuit 1116.

The transmitting coil 1111b may be mounted separately from the transmitting coil 1111a for transferring power according to the inductive coupling method, but may transfer power in the inductive coupling method and resonance coupling method using one single coil.

The transmitting coil 1111b, as described above, forms a magnetic field for transferring power. The transmitting coil 1111b and the resonant circuit 1116 generate resonance when alternating current power is applied thereto, and at this time, a vibration frequency may be determined based on an inductance of the transmitting coil 1111b and a capacitance of the resonant circuit 1116.

For this purpose, the inverter 1112 transforms a DC input obtained from the power supply unit 190 into an AC waveform, and the transformed AC current is applied to the transmitting coil 1111b and the resonant circuit 1116.

In addition, the power conversion unit 111 may further include a frequency adjustment unit 1117 for changing a resonant frequency of the power conversion unit 111. The resonant frequency of the power conversion unit 111 is determined based on an inductance and/or capacitance within a circuit constituting the power conversion unit 111 by Equation 1, and thus the power transmission control unit 112 may determine the resonant frequency of the power conversion unit 111 by controlling the frequency adjustment unit 1117 to change the inductance and/or capacitance.

The frequency adjustment unit 1117, for example, may be configured to include a motor for adjusting a distance between capacitors included in the resonant circuit (or RESONANT GENERATION CIRCUIT) 1116 to change a capacitance, or include a motor for adjusting a number of turns or diameter of the transmitting coil 1111*b* to change an inductance, or include active elements for determining the capacitance and/or inductance.

On the other hand, the power conversion unit 111 may further include a power sensing unit 1115. The operation of the power sensing unit 1115 is the same as the foregoing description.

Referring to FIG. 7B, a configuration of the power supply unit 290 included in the electronic device 200 will be described. The power supply unit 290, as described above, may include the receiving (Rx) coil 2911*b* and resonant circuit 2912.

In addition, the power receiving unit 291 of the power supply unit 290 may further include a rectifier generation circuit 2913 for converting an AC current generated by resonance phenomenon into DC. The rectifier generation circuit 2913 may be configured similarly to the foregoing description.

Furthermore, the power receiving unit 291 may further include a power sensing unit 2914 for monitoring a voltage and/or current of the rectified power. The power sensing unit 2914 may be configured similarly to the foregoing description.

Wireless Power Transmitter Including One or More Transmitting Coils

Figure 8:
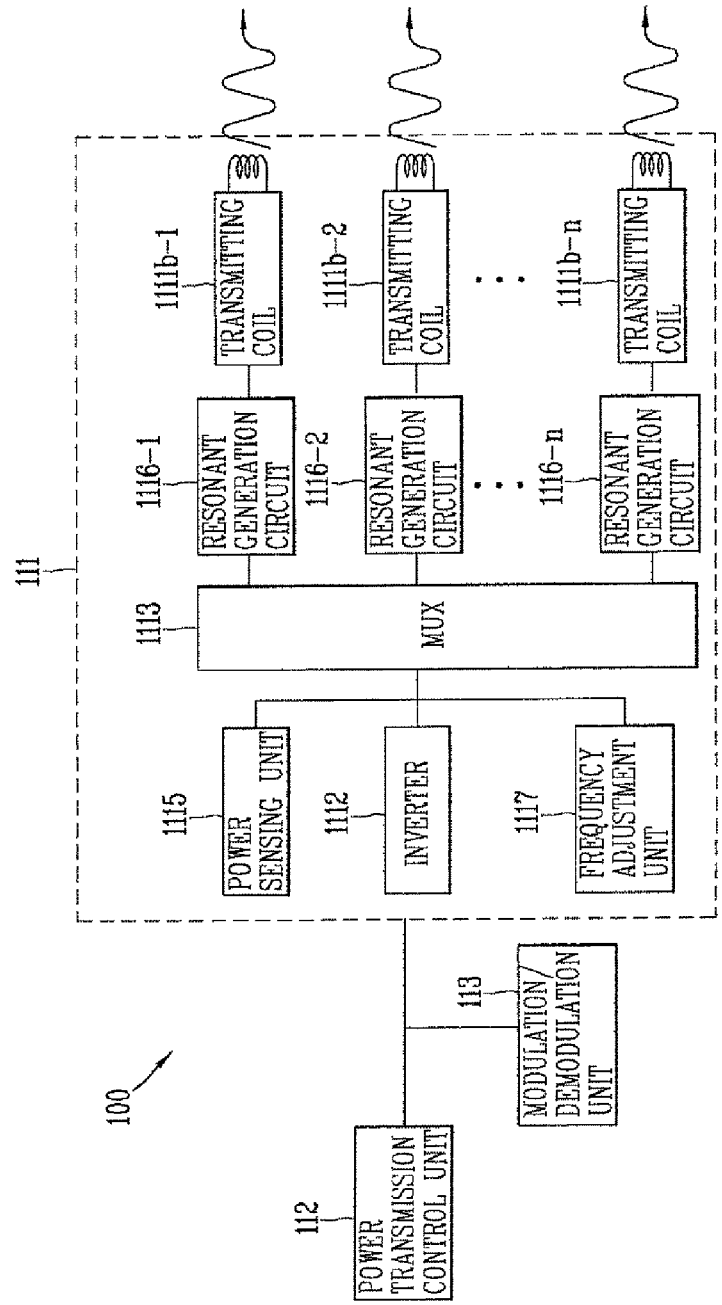
FIG. 8 is a block diagram illustrating a wireless power transmitter configured to have one or more transmitting coils receiving power according to a resonance coupling method that can be employed in the embodiments disclosed herein.

FIG. 8 is a block diagram illustrating a wireless power transmitter configured to have one or more transmission coils receiving power according to a resonance coupling method that can be employed in the embodiments disclosed herein.

Referring to FIG. 8, the power conversion unit 111 of the wireless power transmitter 100 according to the embodiments disclosed herein may include one or more transmitting coils 1111*b*-1 to 1111*b*-*n* and resonant circuits (1116-1 to 1116-*n*) connected to each transmitting coils. Furthermore, the power conversion unit 111 may further include a multiplexer 1113 for establishing and releasing the connection of some of the one or more transmitting coils 1111*b*-1 to 1111*b*-*n*.

The one or more transmitting coils 1111*b*-1 to 1111*b*-*n* may be configured to have the same vibration frequency, or some of them may be configured to have different vibration frequencies. It is determined by an inductance and/or capacitance of the resonant circuits (1116-1 to 1116-*n*) connected to the one or more transmitting coils 1111*b*-1 to 1111*b*-*n*, respectively.

In the meantime, when one or more electronic devices 200 are disposed in an active area or a detection area of the wireless power transmitter 100 including the one or more transmitting coils 1111*b*-1 to 1111*b*-*n*, the power transmission control unit 112 may control the multiplexer 1113 to allow the electronic devices to be placed in different resonance coupling relations. Accordingly, the wireless power transmitter 100 may wirelessly transfer power to the one or more electronic devices by generating the wireless power signal using different coils.

In addition, the power transmission control unit 112 may set power with a different characteristic to be supplied to each of the coils corresponding to the electronic devices. Here, the wireless power transmitter 100 may transfer power by differently setting a power transmission scheme, a resonant frequency, efficiency, a characteristic and the like for each electronic device. The power transmission for one or more electronic devices will be described later with reference to FIG. 28.

For this purpose, the frequency adjustment unit 1117 may be configured to change an inductance and/or capacitance of the resonant circuits (1116-1 to 1116-*n*) connected to the one or more transmitting coils 1111*b*-1 to 1111*b*-*n*, respectively.

Wireless Power Transmitter Implemented as Charger

On the other hand, hereinafter, an example of the wireless power transmitter implemented in the form of a wireless charger will be described.

Figure 9:
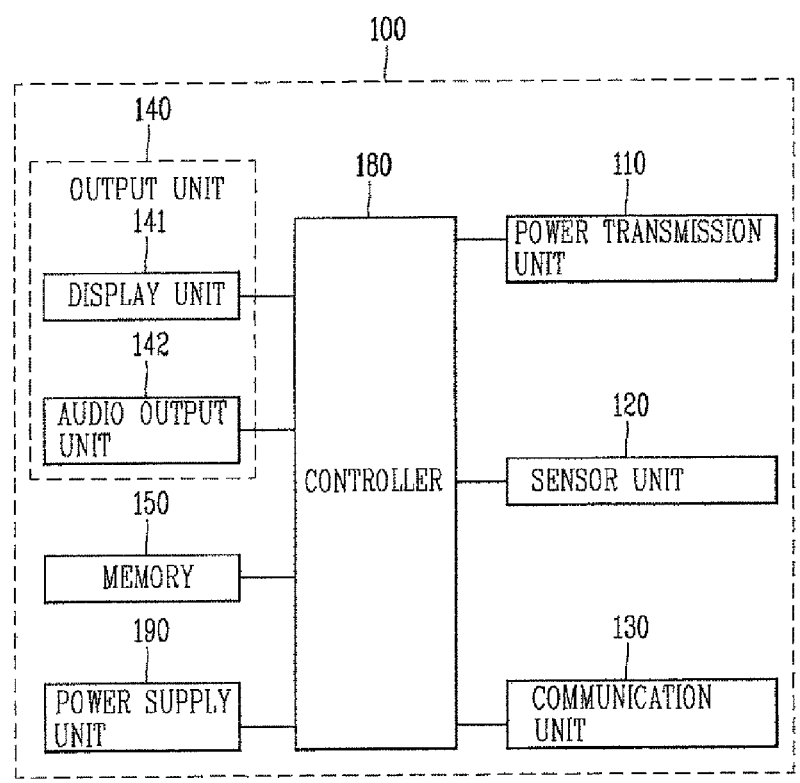
FIG. 9 is a block diagram illustrating a wireless power transmitter further comprising additional constituent elements in addition to the constituent elements illustrated in FIG. 2A.

FIG. 9 is a block diagram illustrating a wireless power transmitter further including an additional element in addition to the configuration illustrated in FIG. 2A.

Referring to FIG. 9, the wireless power transmitter 100 may further include a sensor unit 120, a communication unit 130, an output unit 140, a memory 150, and a control unit (or Controller) 180 in addition to the power transmission unit 110 and power supply unit 190 for supporting at least one of the foregoing inductive coupling method and resonance coupling method.

The control unit 180 controls the power transmission unit 110, the sensor unit 120, the communication unit 130, the output unit 140, the memory 150, and the power supply unit 190.

The control unit 180 may be implemented by a module separated from the power transmission control unit 112 in the power transmission unit 110 described with reference to FIG. 2 or may be implemented by a single module.

The sensor unit 120 may include a sensor for detecting the location of the electronic device 200. The location information detected by the sensor unit 120 may be used for allowing the power transmission unit 110 to transfer power in an efficient manner.

For instance, in case of wireless power transfer according to the inductive coupling method, the sensor unit 120 may be operated as a detection unit, and the location information detected by the sensor unit 120 may be used to move or rotate the transmitting coil 1111*a* in the power transmission unit 110.

Furthermore, for example, the wireless power transmitter 100 configured to include the foregoing one or more transmitting coils may determine coils that can be placed in an inductive coupling relation or resonance coupling relation to the receiving coil of the electronic device 200 among the one or more transmitting coils based on the location information of the electronic device 200.

On the other hand, the sensor unit 120 may be configured to monitor whether or not the electronic device 200 approaches a chargeable region. The approach or non-approach detection function of the sensor unit 120 may be carried out separately from the function of allowing the power transmission control unit 112 in the power transmission unit 110 to detect the approach or non-approach of the electronic device 200.

The communication unit 130 performs wired or wireless data communication with the electronic device 200. The communication unit 130 may include an electronic component for at least any one of Bluetooth™, Zigbee, Ultra Wide Band (UWB), Wireless USB, Near Field Communication (NFC), and Wireless LAN.

The output unit 140 may include at least one of a display unit 141 and an audio output unit (or SOUND OUTPUT UNIT) 142. The display unit 141 may include at least one of a liquid crystal display (LCD), a thin film transistor-liquid crystal display (TFT-LCD), an organic light-emitting diode (OLED), a flexible display, and a three-dimensional (3D)

display. The display unit 141 may display a charging state under the control of the control unit (or Controller) 180.

The memory 150 may include at least one storage medium of a flash memory type, a hard disk type, a multimedia card micro type, a card type memory (e.g., SD or XD memory), a random access memory (RAM), a static random access memory (SRAM), a read-only memory (ROM), an electrically erasable programmable read-only memory (EEPROM), a programmable read-only memory (PROM), a magnetic memory, a magnetic disk, an optical disk, and the like. The wireless power transmitter 100 may operate in association with a web storage performing the storage function of the memory 150 on the Internet. A program or commands performing the foregoing functions of the wireless power transmitter 100 may be stored in the memory 150. The control unit (or Controller) 180 may perform the program or commands stored in the memory 150 to transmit power in a wireless manner. A memory controller (not shown) may be used to allow other constituent elements (e.g., control unit (or Controller) 180) included in the wireless power transmitter 100 to access the memory 150.

However, it would be easily understood by those skilled in the art that the configuration of a wireless power transmitter according to the embodiment disclosed herein may be applicable to an apparatus, such as a docking station, a terminal cradle device, and an electronic device, and the like, excluding a case where it is applicable to only a wireless charger.

Wireless Power Receiver Implemented with Mobile Terminal

Figure 10:
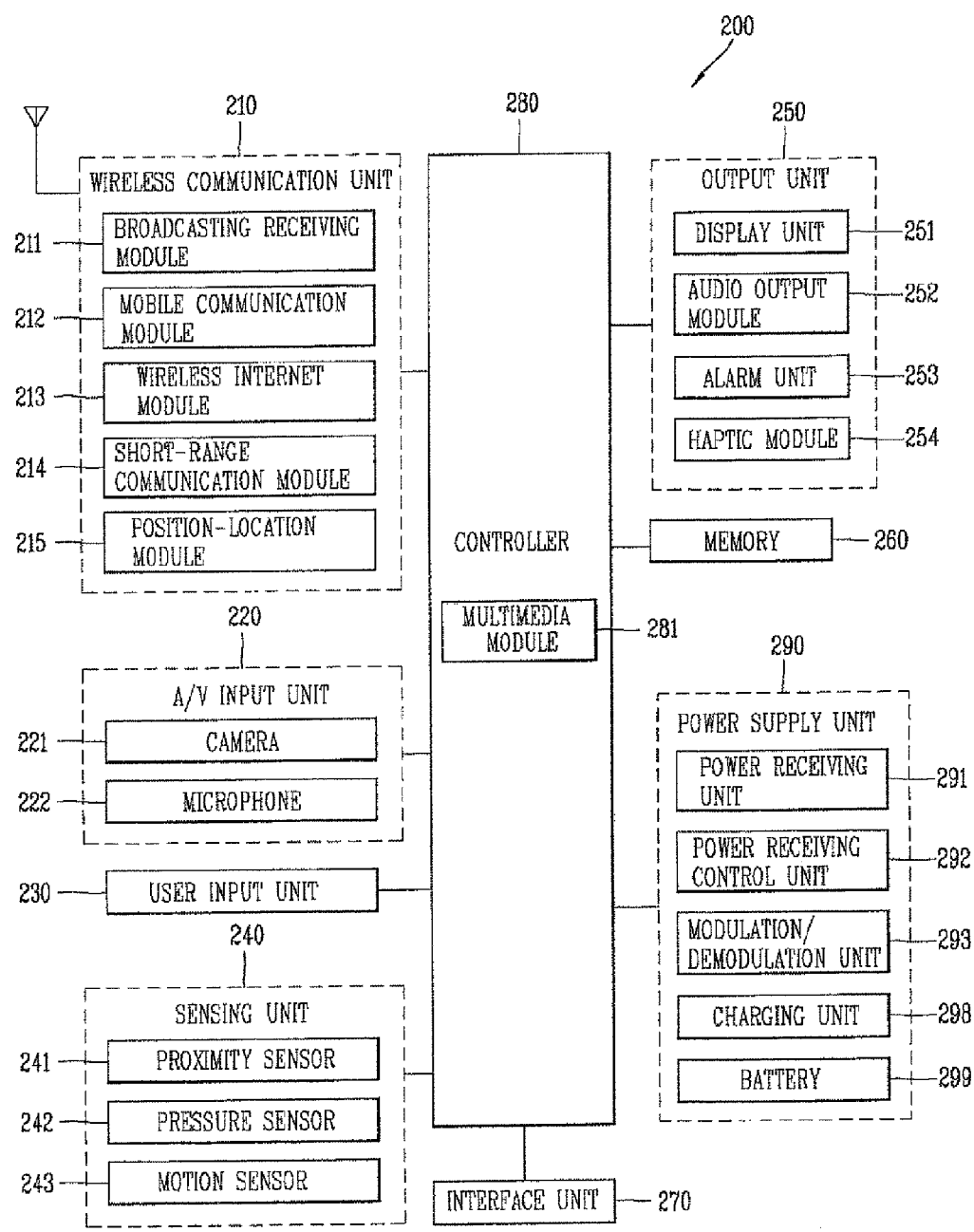
FIG. 10 is a view illustrating a configuration when the electronic device 200 in accordance with the exemplary embodiments is implemented as a mobile terminal.

FIG. 10 is view illustrating a configuration in case where an electronic device 200 according to the embodiments disclosed herein is implemented in the form of a mobile terminal.

The mobile communication terminal 200 may include a power supply unit 290 illustrated in FIG. 2, 4, or 7.

Furthermore, the terminal 200 may further include a wireless communication unit 210, an Audio/Video (A/V) input unit 220, a user input unit 230, a sensing unit 240, an output unit 250, a memory 260, an interface unit 270, and a controller 280. FIG. 10 illustrates the terminal 100 having various components, but it is understood that implementing all of the illustrated components is not a requirement. Greater or fewer components may alternatively be implemented.

Hereinafter, each component is described in sequence.

The wireless communication unit 210 may typically include one or more modules which permit wireless communications between the terminal 200 and a wireless communication system or between the terminal 200 and a network within which the terminal 200 is located. For example, the wireless communication unit 210 may include a broadcast receiving module 211, a mobile communication module 212, a wireless internet module 213, a short-range communication module 214, a position location module 215 and the like.

The broadcast receiving module 211 receives a broadcast signal and/or broadcast associated information from an external broadcast managing entity via a broadcast channel.

The broadcast channel may include a satellite channel and a terrestrial channel. The broadcast center may indicate a server which generates and transmits a broadcast signal and/or broadcast associated information or a server which receives a pre-generated broadcast signal and/or broadcast associated information and sends them to the portable terminal. The broadcast signal may be implemented as a TV broadcast signal, a radio broadcast signal, and a data broadcast signal, among others. The broadcast signal may further include a data broadcast signal combined with a TV or radio broadcast signal.

Examples of broadcast associated information may denote information associated with a broadcast channel, a broadcast program, a broadcast service provider, and the like. The broadcast associated information may be provided via a mobile communication network. In this case, it may be received by the mobile communication module 212.

The broadcast associated information may be implemented in various formats. For instance, broadcast associated information may include Electronic Program Guide (EPG) of Digital Multimedia Broadcasting (DMB), Electronic Service Guide (ESG) of Digital Video Broadcast-Handheld (DVB-H), and the like.

The broadcast receiving module 211 may be configured to receive digital broadcast signals transmitted from various types of broadcast systems. Such broadcast systems may include Digital Multimedia Broadcasting-Terrestrial (DMB-T), Digital Multimedia Broadcasting-Satellite (DMB-S), Media Forward Link Only (MediaFLO), Digital Video Broadcast-Handheld (DVB-H), Integrated Services Digital Broadcast-Terrestrial (ISDB-T) and the like. The broadcast receiving module 211 may be configured to be suitable for every broadcast system transmitting broadcast signals as well as the digital broadcasting systems.

Broadcast signals and/or broadcast associated information received via the broadcast receiving module 211 may be stored in a suitable device, such as a memory 260.

The mobile communication module 212 transmits/receives wireless signals to/from at least any one of a base station, an external portable terminal, and a server on a mobile communication network. The wireless signal may include audio call signal, video (telephony) call signal, or various formats of data according to transmission/reception of text/multimedia messages.

The wireless internet module 213 supports wireless Internet access for the mobile terminal 200. This module may be internally or externally coupled to the terminal 100. Examples of such wireless Internet access may include Wireless LAN (WLAN) (Wi-Fi), Wireless Broadband (Wibro), Worldwide Interoperability for Microwave Access (Wimax), High Speed Downlink Packet Access (HSDPA) and the like.

The short-range communication module 214 denotes a module for short-range communications. Suitable technologies for implementing this module may include Bluetooth, Radio Frequency IDentification (RFID), Infrared Data Association (IrDA), Ultra-WideBand (UWB), Zig Bee, and the like. On the other hand, Universal Serial Bus (USB), IEEE 1394, Thunderbolt of Intel technology, and the like, may be used for wired short-range communication.

The wireless internet module 213 or the short-range communication module 214 may establish data communication connection to the wireless power transmitter 100.

Through the established data communication, when there is an audio signal to be outputted while transferring power in a wireless manner, the wireless internet module 213 or the short-range communication module 214 may transmit the audio signal to the wireless power transmitter 100 through the short-range communication module. Furthermore, through the established data communication, when there is information to be displayed, the wireless internet module 213 or the short-range communication module 214 may transmit the information to the wireless power transmitter 100. Otherwise, the wireless internet module 213 or the short-range communication module 214 may transmit an audio signal received through a microphone integrated in the wireless power transmitter 100. Furthermore, the wireless internet module 213 or the short-range communication module 214 may transmit the identification information (e.g., phone number or device name in case of a portable phone) of the mobile terminal 200 to the wireless power transmitter 100 through the established data communication.

The position location module 215 is a module for acquiring a position of the terminal. An example of the position location module 215 may include a Global Position System (GPS) module.

Referring to FIG. 10, the A/V input unit 220 is configured to provide audio or video signal input to the portable terminal. The A/V input unit 220 may include a camera 221 and a microphone 222. The camera 221 processes image frames of still or moving images obtained by an image sensor in a video call mode or a capture more. The processed image frames may be displayed on the display unit 251.

The image frames processed by the camera 221 may be stored in the memory 260 or transmitted to the exterior via the wireless communication unit 210. Two or more cameras 221 may be provided therein according to the use environment.

The microphone 222 may receive an external audio signal by a microphone in a phone call mode, a recording mode, a voice recognition mode, or the like to process it into electrical audio data. The processed audio data is converted and outputted into a format transmittable to a mobile communication base station via the mobile communication module 212 in case of the phone call mode. The microphone 222 may include various noise removal algorithms to remove noises generated while receiving the external audio signal.

The user input unit 230 may generate input data to allow the user to control the operation of the terminal. The user input unit 230 may include a keypad, a dome switch, a touchpad (e.g., static pressure/capacitance), a jog wheel, a jog switch and the like.

The sensing unit 240 may include a proximity sensor 241, a pressure sensor 242, a motion sensor 243, and the like. The proximity sensor 241 detects an object approaching the mobile terminal 200, or the presence or absence of an object existing adjacent to the mobile terminal 200, and the like without any mechanical contact. The proximity sensor 241 may detect a proximity object using a change of the AC magnetic field or static magnetic field, a change rate of the electrostatic capacity, or the like. Two or more proximity sensors 241 may be provided according to the aspect of configuration.

The pressure sensor 242 may detect whether or not a pressure is applied to the mobile terminal 200, a size of the pressure, and the like. The pressure sensor 242 may be provided at a portion where the detection of a pressure is required in the mobile terminal 200 according to the use environment. When the pressure sensor 242 is provided in the display unit 251, it may be possible to identify a touch input through the display unit 251 and a pressure touch input by which a pressure larger than the touch input is applied according to a signal outputted from the pressure sensor 242. Furthermore, it may be possible to know a size of the pressure applied to the display unit 251 during the input of a pressure touch.

The motion sensor 243 detects the location or movement of the mobile terminal 200 using an acceleration sensor, a gyro sensor, and the like. The acceleration sensor used in the motion sensor 243 is an element for converting an acceleration change in any one direction into an electrical signal. Two or three axes are typically integrated into a package to constitute an acceleration sensor, and only one Z-axis may be required according to the use environment. Accordingly, when an acceleration sensor in the direction of X-axis or Y-axis should be used instead of the direction of Z-axis due to any reason, the acceleration sensor may be erected and mounted on a main substrate using a separate piece substrate.

Furthermore, the gyro sensor is a sensor for measuring an angular speed of the mobile terminal 200 in a rotational movement to detect a rotated angle with respect to each reference direction. For instance, the gyro sensor may detect each rotational angle, i.e., azimuth, pitch and roll, with reference to three directional axes.

The output unit 250 is provided to output visual, auditory, or tactile information. The output unit 250 may include a display unit 251, an audio output module 252, an alarm unit 253, a haptic module 254, and the like.

The display unit 251 may display (output) information processed in the terminal 200. For example, when the terminal is in a phone call mode, the display unit 251 will provide a User Interface (UI) or Graphic User Interface (GUI) associated with the call. When the terminal is in a video call mode or a capture mode, the display unit 251 may display images captured and/or received, UI, or GUI.

The display unit 251 may include at least one of a liquid crystal display (LCD), a thin film transistor-liquid crystal display (TFT-LCD), an organic light-emitting diode (OLED), a flexible display, a three-dimensional (3D) display, and the like.

Some of those displays may be configured as a transparent type or a light transmission type through which the outside is visible, which is referred to as a transparent display. A representative example of the transparent display may include a Transparent OLED (TOLED), or the like. The rear surface of the display unit 151 may also be implemented to be optically transparent. Under this configuration, the user can view an object positioned at a rear side of the terminal body through a region occupied by the display unit 251 of the terminal body.

The display unit 251 may be implemented in two or more in number according to a configured aspect of the terminal 200. For instance, a plurality of the display units 251 may be arranged on one surface to be spaced apart from or integrated with each other, or may be arranged on different surfaces.

Here, if the display unit 251 and a touch sensitive sensor (referred to as a touch sensor) have a layered structure therebetween, the display unit 251 may be used as an input device rather than an output device. The touch sensor may be implemented as a touch film, a touch sheet, a touch pad, and the like.

The touch sensor may be configured to convert changes of a pressure applied to a specific part of the display unit 251, or a capacitance occurring from a specific part of the display unit 251, into electric input signals. Also, the touch sensor may be configured to sense not only a touched position and a touched area, but also a touch pressure.

When touch inputs are sensed by the touch sensors, corresponding signals are sent to a touch controller. The touch controller processes the received signals, and then transmits corresponding data to the controller 280. Accordingly, the controller 280 may sense which region of the display unit 151 has been touched.

The proximity sensor 241 may be arranged at an inner region of the terminal covered by the touch screen, or near the touch screen. The proximity sensor refers to a sensor to sense the presence or absence of an object approaching a surface to be sensed, or an object disposed near a surface to be sensed, using an electromagnetic field or infrared rays without a mechanical contact. The proximity sensor has a longer lifespan and a more enhanced utility than a contact sensor.

The proximity sensor may include a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and so on. When the touch screen is implemented as a capacitance type, proximity of a pointer to the touch screen is sensed by changes of an electromagnetic field. In this case, the touch screen (touch sensor) may be categorized into a proximity sensor.

Hereinafter, for the sake of brief explanation, a status that the pointer is positioned to be proximate onto the touch screen without contact will be referred to as a "proximity touch", whereas a status that the pointer substantially comes in contact with the touch screen will be referred to as a "contact touch". For the position corresponding to the proximity touch of the pointer on the touch screen, such position corresponds to a position where the pointer faces perpendicular to the touch screen upon the proximity touch of the pointer.

The proximity sensor senses proximity touch, and proximity touch patterns (e.g., distance, direction, speed, time, position, moving status, etc.). Information relating to the sensed proximity touch and the sensed proximity touch patterns may be output onto the touch screen.

The audio output module 252 may output audio data received from the wireless communication unit 210 or stored in the memory 260, in a call-receiving mode, a call-placing mode, a recording mode, a voice recognition mode, a broadcast reception mode, and so on. The audio output module 252 may output audio signals relating to functions performed in the terminal 200, e.g., sound alarming a call received or a message received, and so on. The audio output module 252 may include a receiver, a speaker, a buzzer, and so on.

The alarm 253 outputs signals notifying the occurrence of an event from the terminal 200. The event occurring from the terminal 100 may include call received, message received, key signal input, touch input, and so on. The alarm 253 may output not only video or audio signals, but also other types of signals such as signals notifying occurrence of events in a vibration manner. Since the video or audio signals can be output through the display unit 251 or the audio output unit 252, the display unit 251 and the audio output module 252 may be categorized into part of the alarm 253.

The haptic module 254 generates various tactile effects which a user can feel. A representative example of the tactile effects generated by the haptic module 254 includes vibration. Vibration generated by the haptic module 254 may have a controllable intensity, a controllable pattern, and so on. For instance, different vibration may be output in a synthesized manner or in a sequential manner.

The haptic module 254 may generate various tactile effects, including not only vibration, but also arrangement of pins vertically moving with respect to a skin being contacted, air injection force or air suction force through an injection hole or a suction hole, touch by a skin surface, presence or absence of contact with an electrode, effects by stimulus such as an electrostatic force, reproduction of cold or hot feeling using a heat absorbing device or a heat emitting device, and the like.

The haptic module 254 may be configured to transmit tactile effects through the user's direct contact, or the user's muscular sense using a finger or a hand. The haptic module 254 may be implemented in two or more in number according to the configuration of the terminal 200.

The memory 260 may store a program for the processing and control of the controller 280. Alternatively, the memory 260 may temporarily store input/output data (e.g., phonebook data, messages, still images, video and the like). Also, the memory 260 may store data related to various patterns of vibrations and audio output upon the touch input on the touch screen.

In some embodiments, software components including an operating system (not shown), a module performing a wireless communication unit 210 function, a module operating together with the user input unit 230, a module operating together with the A/V input unit 220, a module operating together with the output unit 250 may be stored in the memory 260. The operating system (e.g., LINUX, UNIX, OS X, WINDOWS, Chrome, Symbian, iOS, Android, VxWorks, or other embedded operating systems) may include various software components and/or drivers to control system tasks such as memory management, power management, and the like.

In addition, the memory 260 may store a setup program associated with contactless power transfer or wireless charging. The setup program may be implemented by the controller 280.

Furthermore, the memory 260 may store an application associated with contactless power transfer (or wireless charging) downloaded from an application providing server (for example, an app store). The wireless charging related application is a program for controlling wireless charging transmission, and thus the electronic device 200 may receive power from the wireless power transmitter 100 in a wireless manner or establish connection for data communication with the wireless power transmitter 100 through the relevant program.

The memory 260 may be implemented using any type of suitable storage medium including a flash memory type, a hard disk type, a multimedia card micro type, a memory card type (e.g., SD or xD, memory), a random access memory (RAM), a static random access memory (SRAM), a read-only memory (ROM), an electrically erasable programmable read-only memory (EEPROM), a programmable read-only memory (PROM), a magnetic memory, a magnetic disk, an optical disk, and the like. Also, the terminal 200 may be operated in association with a web storage performing the storage function of the memory 160 on the Internet.

The interface unit 270 may generally be implemented to interface the portable terminal with all external devices. The interface unit 270 may allow a data reception from an external device, a power delivery to each component in the terminal 200, or a data transmission from the terminal 200 to an external device. The interface unit 270 may include, for example, wired/wireless headset ports, external charger ports, wired/wireless data ports, memory card ports, ports for coupling devices having an identification module, audio input/output (I/O) ports, video input/output (I/O) ports, earphone ports, and the like.

The identification module may be configured as a chip for storing various information required to authenticate an authority to use the terminal 200, which may include a User Identity Module (UIM), a Subscriber Identity Module (SIM), and the like. Also, the device having the identification module (hereinafter, referred to as "identification device") may be implemented in a type of smart card. Hence, the identification device can be coupled to the terminal 200 via a port.

Also, the interface unit may serve as a path for power to be supplied from an external cradle to the terminal 200 when the terminal 100 is connected to the external cradle or as a path for transferring various command signals inputted from the cradle by a user to the terminal 200. Such various command signals or power inputted from the cradle may operate as signals for recognizing that the terminal 200 has accurately been mounted to the cradle.

The controller 280 typically controls the overall operations of the terminal 200. For example, the controller 280 performs the control and processing associated with telephony calls, data communications, video calls, and the like. The controller 280 may include a multimedia module 281 for multimedia playback. The multimedia module 281 may be implemented within the controller 280, or implemented separately from the controller 280. Also, the controller 180 may be implemented as a separate module from the power reception control unit 292 within the power supply unit 290 or an integrally single module therewith.

The controller 280 can perform a pattern recognition processing so as to recognize a writing input or image drawing input carried out on the touch screen as a text or image.

The controller 280 performs wired or wireless charging according to the user input or internal input. Here, the internal input represents a signal for notifying that an induced current generated from a secondary coil within the terminal has been detected.

When the foregoing wireless charging is carried out, an operation of allowing the controller 280 to control each constituent element will be described in detail below with reference to the operation phase in FIG. 14. As described above, the Power reception control unit (or POWER RECEIVING CONTROL UNIT) 292 within the power supply unit 290 may be implemented to be included in the controller 280, and in the present disclosure, it should be understood that the controller 280 performs the operation by the Power reception control unit (or POWER RECEIVING CONTROL UNIT) 292.

The power supply unit 290 receives internal and external power under the control of the controller 280 to supply power required for the operation of each constituent element.

The power supply unit 290 is provided with a battery 299 for supplying power to each constituent element of the terminal 200, and the battery 299 may include a charger 298 for performing wired or wireless charging.

The present disclosure discloses a mobile terminal as an example of the apparatus for receiving power in a wireless manner, but it would be easily understood by those skilled in the art that the configuration according to the embodiment disclosed herein may be applicable to a stationary terminal, such as a digital TV, a desktop computer, and the like, excluding a case where it is applicable to only the mobile terminal.

Figure 11:
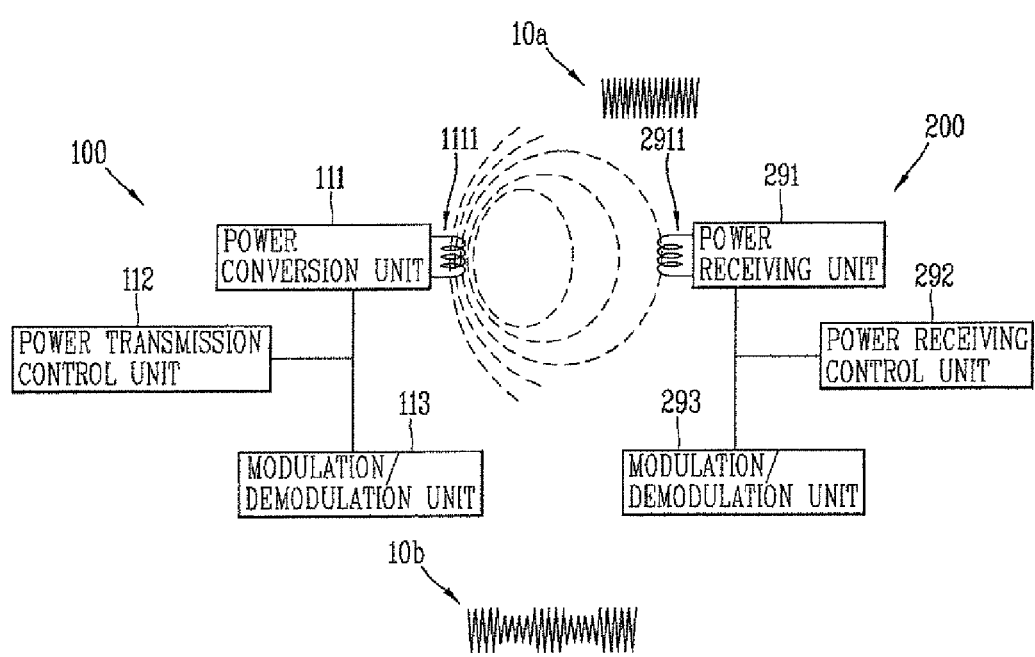
FIG. 11 is a view illustrating a concept of transmitting and receiving a packet between a wireless power transmitter and an electronic device through the modulation and demodulation of a wireless power signal in transferring power in a wireless manner disclosed herein.

FIG. 11 is a view illustrating the concept of transmitting and receiving a packet between a wireless power transmitter and an electronic device through the modulation and demodulation of a wireless power signal in transferring power in a wireless manner disclosed herein.

As illustrated in FIG. 11, the power conversion unit 111 included in the wireless power transmitter 100 may generate a wireless power signal. The wireless power signal may be generated through the transmitting coil 1111 included in the power conversion unit 111.

The wireless power signal 10a generated by the power conversion unit 111 may arrive at the electronic device 200 so as to be received through the power receiving unit 291 of the electronic device 200. The generated wireless power signal may be received through the receiving coil 2911 included in the power receiving unit 291.

The power reception control unit 292 may control the modulation/demodulation unit 293 connected to the power receiving unit 291 to modulate the wireless power signal while the wireless power receiver 200 receives the wireless power signal. When the received wireless power signal is modulated, the wireless power signal may form a closed-loop within a magnetic field or an electro-magnetic field.

This may allow the wireless power transmitter 100 to sense a modulated wireless power signal 10b. The modulation/demodulation unit 113 may demodulate the sensed wireless power signal and decode the packet from the demodulated wireless power signal.

The modulation method employed for the communication between the wireless power transmitter 100 and the electronic device 200 may be an amplitude modulation. As aforementioned, the amplitude modulation is a backscatter modulation may be a backscatter modulation method in which the power communications modulation/demodulation unit 293 at the side of the electronic device 200 changes an amplitude of the wireless power signal 10a formed by the power conversion unit 111 and the power reception control unit 292 at the side of the wireless power transmitter 100 detects an amplitude of the modulated wireless power signal 10b.

Modulation and Demodulation of Wireless Power Signal

Hereinafter, description will be given of modulation and demodulation of a packet, which is transmitted or received between the wireless power transmitter 100 and the electronic device 200 with reference to FIGS. 12 and 13.

Figure 12:
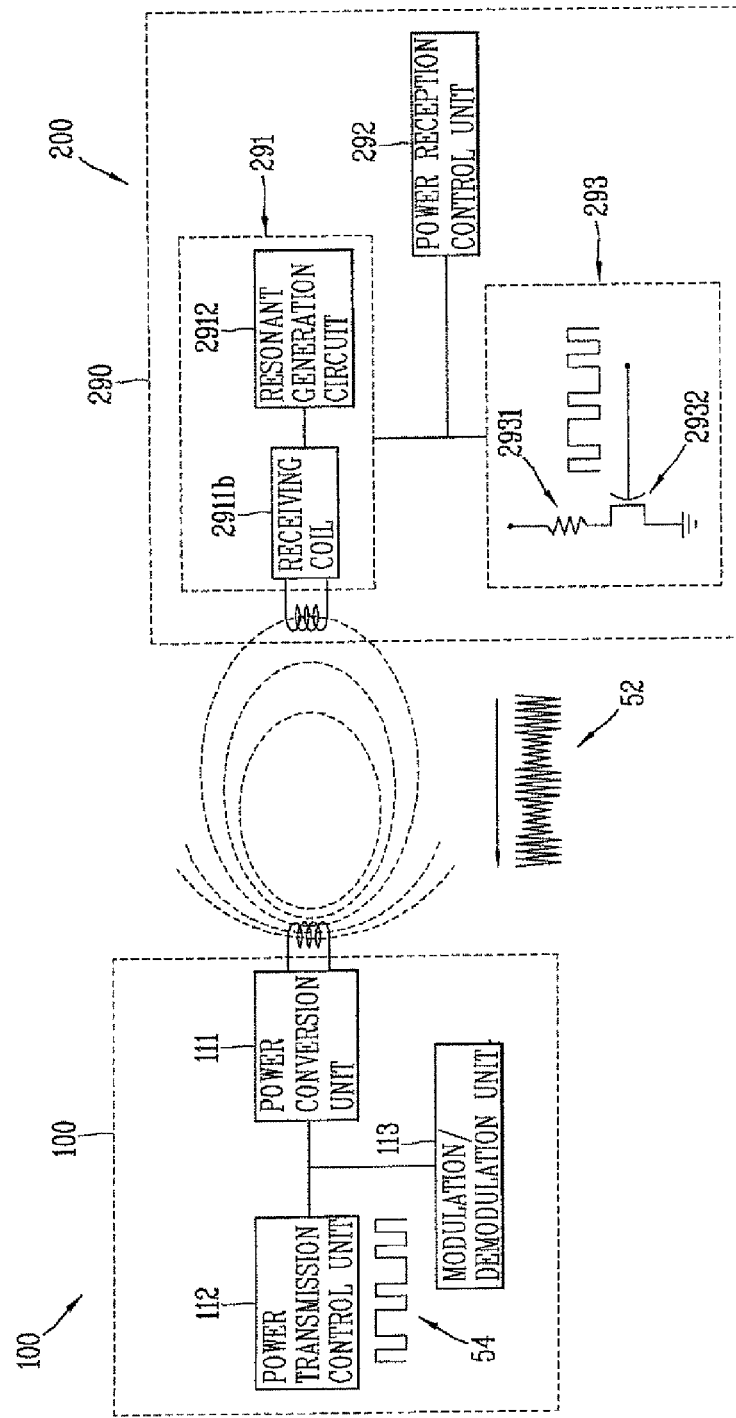
FIG. 12 is a view illustrating a configuration of transmitting and receiving a power control message in transferring power in a wireless manner disclosed herein.

FIG. 12 is a view illustrating a configuration of transmitting and receiving a power control message in transferring power in a wireless manner disclosed herein. FIG. 13 is a view illustrating forms of signals upon modulation and demodulation executed in a wireless power transfer disclosed herein.

Referring to FIG. 12, the wireless power signal received through the power receiving unit 291 of the electronic device 200, as illustrated in FIG. 13A, may be a non-modulated wireless power signal 51. The electronic device 200 and the wireless power transmitter 100 may establish a resonance coupling according to a resonant frequency, which is set by the resonant circuit 2912 within the power receiving unit 291, and the wireless power signal 51 may be received through the receiving coil 2911b.

The power reception control unit 292 may modulate the wireless power signal 51 received through the power receiving unit 291 by changing a load impedance within the modulation/demodulation unit 293. The modulation/demodulation unit 293 may include a passive element 2931 and an active element 2932 for modulating the wireless power signal 51. The modulation/demodulation unit 293 may modulate the wireless power signal 51 to include a packet, which is desired to be transmitted to the wireless power transmitter 100. Here, the packet may be input into the active element 2932 within the modulation/demodulation unit 293.

Afterwards, the power transmission control unit 112 of the wireless power transmitter 100 may demodulate a modulated wireless power signal 52 through an envelop detection, and decode the detected signal 53 into digital data 54. The demodulation may detect a current or voltage flowing into the power conversion unit 111 to be classified into two states, a HI phase and a LO phase, and acquire a packet to be transmitted by the electronic device 200 based on digital data classified according to the states.

Hereinafter, a process of allowing the wireless power transmitter 100 to acquire a power control message to be transmitted by the electronic device 200 from the demodulated digital data will be described.

Referring to FIG. 13B, the power transmission control unit 112 detects an encoded bit using a clock signal (CLK) from an envelope detected signal. The detected encoded bit is encoded according to a bit encoding method used in the modulation process at the side of the wireless power receiver 200. The bit encoding method may correspond to any one of non-return to zero (NRZ) and bi-phase encoding.

For instance, the detected bit may be a differential bi-phase (DBP) encoded bit. According to the DBP encoding, the power reception control unit 292 at the side of the wireless power receiver 200 is allowed to have two state transitions to encode data bit 1, and to have one state transition to encode data bit 0. In other words, data bit 1 may be encoded in such a manner that a transition between the HI state and LO state is generated at a rising edge and falling edge of the clock signal, and data bit 0 may be encoded in such a manner that a transition between the HI state and LO state is generated at a rising edge of the clock signal.

On the other hand, the power transmission control unit 112 may acquire data in a byte unit using a byte format constituting a packet from a bit string detected according to the bit encoding method. For instance, the detected bit string may be transferred by using an 11-bit asynchronous serial format as illustrated in FIG. 13C. In other words, the detected bit may include a start bit indicating the beginning of a byte and a stop bit indicating the end of a byte, and also include data bits (b0 to b7) between the start bit and the stop bit. Furthermore, it may further include a parity bit for checking an error of data. The data in a byte unit constitutes a packet including a power control message.

Packet Format

Hereinafter, description will be given of a structure of a packet used in communication using a wireless power signal according to the exemplary embodiments disclosed herein.

Figure 14:
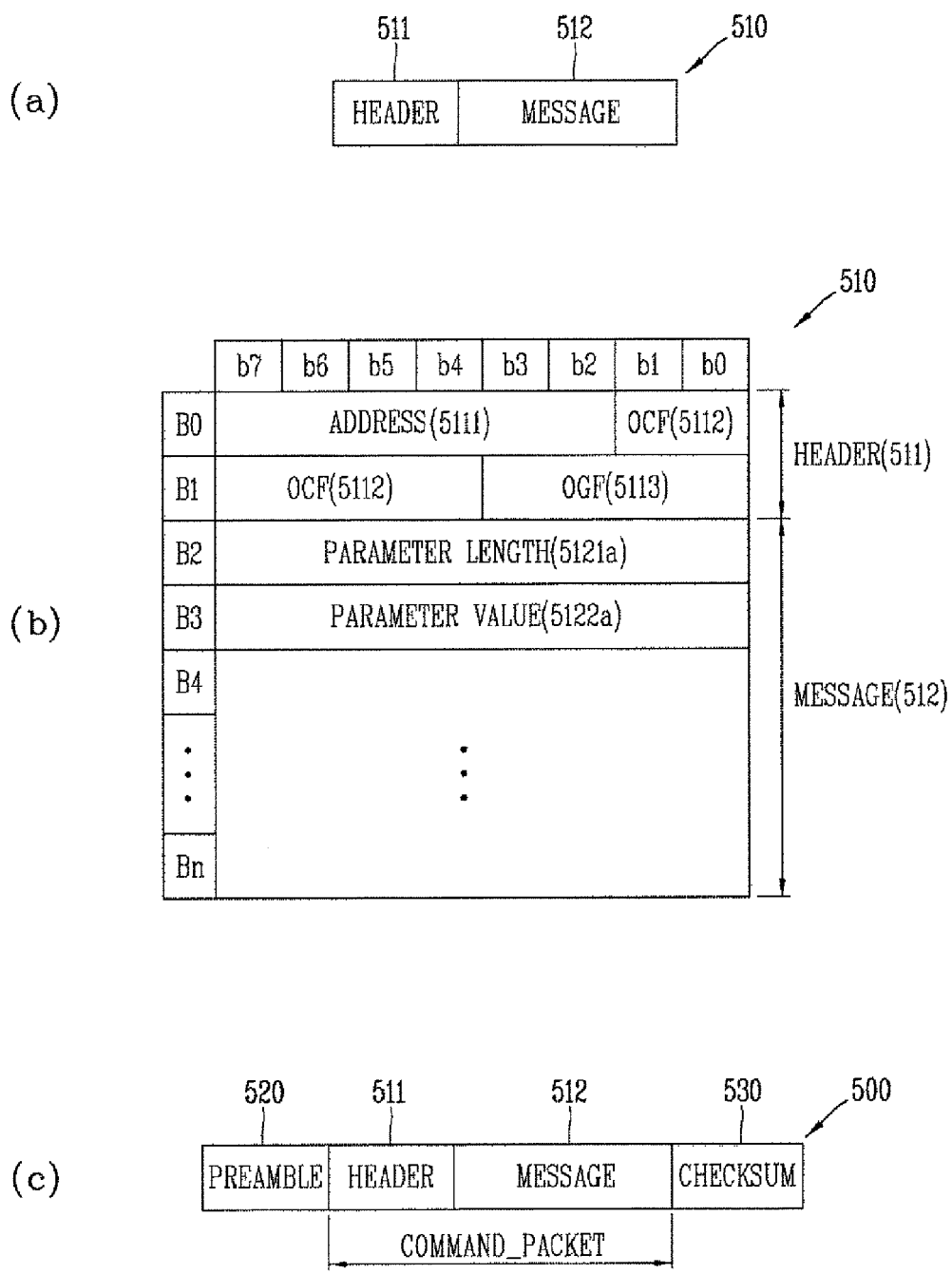
FIG. 14 is a view illustrating a packet including a power control message used in a contactless (wireless) power transfer method according to the embodiments disclosed herein.

FIG. 14 is a view illustrating a packet including a power control message used in a contactless (wireless) power transfer method according to the embodiments disclosed herein.

As illustrated in FIG. 14A, the wireless power transmitter 100 and the electronic device 200 may transmit and receive data desired to transmit in a form of a command packet (command_packet) 510. The command packet 510 may include a header 511 and a message 512.

The header 511 may include a field indicating a type of data included in the message 512. Size and type of the message may be decided based on a value of the field which indicates the type of data.

The header 511 may include an address field for identifying a transmitter (originator) of the packet. For example, the address field may indicate an identifier of the electronic device 200 or an identifier of a group to which the wireless power receiver 200 belongs. When the wireless power receiver 200 transmits the packet 510, the electronic device 200 may generate the packet 510 such that the address field can indicate identification information related to the electronic device 200 itself.

The message 512 may include data that the originator of the packet 510 desires to transmit. The data included in the message 512 may be a report, a request or a response for the other party.

According to one exemplary embodiment, the command packet 510 may be configured as illustrated in FIG. 14B. The header 511 included in the command packet 510 may be represented with a predetermined size. For example, the header 511 may have a 2-byte size.

The header 511 may include a reception address field. For example, the reception address field may have a 6-bit size.

The header 511 may include an operation command field (OCF) or an operation group field (OGF). The OGF is a value given for each group of commands for the electronic device 200, and the OCF is a value given for each command existing in each group in which the wireless power receiver 200 is included.

The message 512 may be divided into a length field 5121 of a parameter and a value field 5122 of the parameter. That is, the originator of the packet 510 may generate the message by a length-value pair (5121a-5122a, etc.) of at least one parameter, which is required to represent data desired to transmit.

Referring to FIG. 14C, the wireless power transmitter 100 and the electronic device 200 may transmit and receive the data in a form of a packet which further has a preamble 520 and a checksum 530 added to the command packet 510.

The preamble 520 may be used to perform synchronization with data received by the wireless power transmitter 100 and detect the start bit of the header 520. The preamble 520 may be configured to repeat the same bit. For instance, the preamble 520 may be configured such that data bit 1 according to the DBP encoding is repeated eleven to twenty five times.

The checksum 530 may be used to detect an error that can be occurred in the command packet 510 while transmitting a power control message.

Power Control Messages According to Operation Phases

Hereinafter, description will be given of operation phases of the wireless power transmitter 100 and the electronic device 200, and power control messages transmitted and received in the operation phases.

Figure 15:
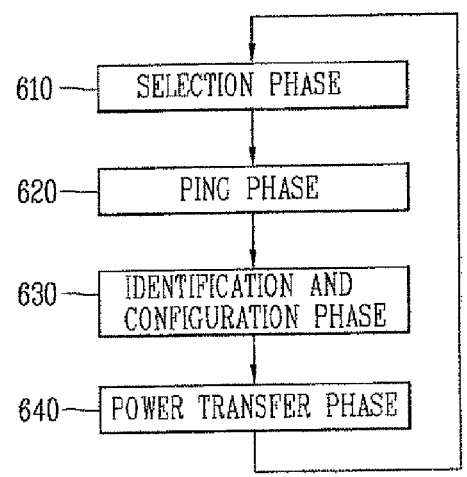
FIG. 15 is a view illustrating operation phases of the wireless power transmitter 100 and the electronic device 200 according to the embodiments disclosed herein.

FIG. 15 illustrates the operation phases of the wireless power transmitter 100 and the electronic device 200 according to the embodiments disclosed herein. Furthermore, FIGS. 14 to 18 illustrate the structures of packets including a power control message between the wireless power transmitter 100 and the electronic device 200. However, the power control messages described with reference to FIG. 15 merely illustrate, but not limited to, examples of power control messages transmitted and received according to each operation phase.

Referring to FIG. 13, the operation phases of the wireless power transmitter 100 and the wireless power receiver 200 for wireless power transfer may be divided into a selection phase (state) 610, a ping phase 620, an identification and configuration phase 630, and a power transfer phase 640.

The wireless power transmitter 100 detects whether or not objects exist within a range that the wireless power transmitter 100 can transmit power in a wireless manner in the selection phase 610, and the wireless power transmitter 100 sends a detection signal to the detected object and the electronic device 200 sends a response to the detection signal in the ping phase 620.

Furthermore, the wireless power transmitter 100 identifies the wireless power receiver 200 selected through the previous phases and acquires configuration information for power transmission in the identification and configuration phase 630. The wireless power transmitter 100 transmits power to the electronic device 200 while controlling power transmitted in response to a control message received from the electronic device 200 in the power transfer phase 640.

Hereinafter, each of the operation phases will be described in detail.

1) Selection Phase

The wireless power transmitter 100 in the selection phase 610 performs a detection process to select the electronic device 200 existing within a detection area. The detection area, as described above, refers to a region in which an object within the relevant area can affect on the characteristic of the power of the power conversion unit 111. Compared to the ping phase 620, the detection process for selecting the electronic device 200 in the selection phase 610 is a process of detecting a change of the power amount for forming a wireless power signal in the power conversion unit at the side of the wireless power transmitter 100 to check whether any object exists within a predetermined range, instead of the scheme of receiving a response from the electronic device 200 using a power control message. The detection process in the selection phase 610 may be referred to as an analog ping process in the aspect of detecting an object using a wireless power signal without using a packet in a digital format in the ping phase 620 which will be described later.

The wireless power transmitter 100 in the selection phase 610 can detect that an object comes in or out within the detection area. Furthermore, the wireless power transmitter 100 can distinguish the electronic device 200 capable of transferring power in a wireless manner from other objects (for example, a key, a coin, etc.) among objects located within the detection area.

As described above, a distance that can transmit power in a wireless manner may be different according to the inductive coupling method and resonance coupling method, and thus the detection area for detecting an object in the selection phase 610 may be different from one another.

First, in case where power is transmitted according to the inductive coupling method, the wireless power transmitter 100 in the selection phase 610 can monitor an interface surface (not shown) to detect the alignment and removal of objects.

Furthermore, the wireless power transmitter 100 may detect the location of the electronic device 200 placed on an upper portion of the interface surface. As described above, the wireless power transmitter 100 formed to include one or more transmitting coils may perform the process of entering the ping phase 620 in the selection phase 610, and checking whether or not a response to the detection signal is transmitted from the object using each coil in the ping phase 620 or subsequently entering the identification phase 630 to check whether identification information is transmitted from the object. The wireless power transmitter 100 may determine a coil to be used for contactless power transfer based on the detected location of the electronic device 200 acquired through the foregoing process.

Furthermore, when power is transmitted according to the resonance coupling method, the wireless power transmitter 100 in the selection phase 610 can detect an object by detecting that any one of a frequency, a current and a voltage of the power conversion unit is changed due to an object located within the detection area.

On the other hand, the wireless power transmitter 100 in the selection phase 610 may detect an object by at least any one of the detection methods using the inductive coupling method and resonance coupling method. The wireless power transmitter 100 may perform an object detection process according to each power transmission method, and subsequently select a method of detecting the object from the coupling methods for contactless power transfer to advance to other phases 620, 630, 640.

On the other hand, for the wireless power transmitter 100, a wireless power signal formed to detect an object in the selection phase 610 and a wireless power signal formed to perform digital detection, identification, configuration and power transmission in the subsequent phases 620, 630, 640 may have a different characteristic in the frequency, strength, and the like. It is because the selection phase 610 of the wireless power transmitter 100 corresponds to an idle state for detecting an object, thereby allowing the wireless power transmitter 100 to reduce consumption power in the idle state or generate a specialized signal for effectively detecting an object.

2) Ping Phase

The wireless power transmitter 100 in the ping phase 620 performs a process of detecting the electronic device 200 existing within the detection area through a power control message. Compared to the detection process of the electronic device 200 using a characteristic of the wireless power signal and the like in the selection phase 610, the detection process in the ping phase 620 may be referred to as a digital ping process.

The wireless power transmitter 100 in the ping phase 620 forms a wireless power signal to detect the electronic device 200, modulates the wireless power signal modulated by the electronic device 200, and acquires a power control message in a digital data format corresponding to a response to the detection signal from the modulated wireless power signal. The wireless power transmitter 100 may receive a power control message corresponding to the response to the detection signal to recognize the electronic device 200 which is a subject of power transmission.

The detection signal formed to allowing the wireless power transmitter 100 in the ping phase 620 to perform a digital detection process may be a wireless power signal formed by applying a power signal at a specific operating point for a predetermined period of time. The operating point may denote a frequency, duty cycle, and amplitude of the voltage applied to the transmitting (Tx) coil. The wireless power transmitter 100 may generate the detection signal generated by applying the power signal at a specific operating point for a predetermined period of time, and attempt to receive a power control message from the electronic device 200.

On the other hand, the power control message corresponding to a response to the detection signal may be a message indicating strength of the wireless power signal received by the electronic device 200. The strength of the power signal within the message indicating the strength of the wireless power signal may be a value indicating a degree of inductive coupling or resonance coupling for power transmission between the wireless power transmitter 100 and the electronic device 200.

The wireless power transmitter 100 may receive a response message to the detection signal to find the electronic device 200, and then extend the digital detection process to enter the identification and configuration phase 630. In other words, the wireless power transmitter 100 maintains the power signal at a specific operating point subsequent to finding the electronic device 200 to receive a power control message required in the identification and configuration phase 630.

However, if the wireless power transmitter 100 is not able to find the electronic device 200 to which power can be transferred, then the operation phase of the wireless power transmitter 100 will be returned to the selection phase 610.

3) Identification and Configuration Phase

The wireless power transmitter 100 in the identification and configuration phase 630 may receive identification information and/or configuration information transmitted by the electronic device 200, thereby controlling power transmission to be effectively carried out.

The electronic device 200 in the identification and configuration phase 630 may transmit a power control message including its own identification information. The message including the identification information may include information indicating a version of the contract for wireless power transfer, information for identifying a manufacturer of the electronic device 200, information indicating the presence or absence of an extended device identifier, or a basic device identifier 5235. Furthermore, if it is displayed that an extended device identifier exists in the information indicating the presence or absence of an extended device identifier, the message including the extended device identifier may include the identification information on the manufacturer for identifying the electronic device 200, and information based on the basic device identifier or the extended device identifier.

The electronic device 200 may transmit a power control message including information on expected maximum power in the identification and configuration phase 630. The message including the information on the expected maximum power may include power class, information on expected maximum power, an indicator indicating a method of determining a current of a main cell at the side of the wireless power transmitter, or the number of optional configuration packets. The indicator may indicate whether or not a current of the main cell at the side of the wireless power transmitter is determined as specified in the contract for wireless power transfer.

On the other hand, the wireless power transmitter 100 may generate a power transfer contract which is used for power charging with the electronic device 200 based on the identification information and/or configuration information. The power transfer contract may include the limits of parameters determining a power transfer characteristic in the power transfer phase 640.

The wireless power transmitter 100 may terminate the identification and configuration phase 630 and return to the selection phase 610 prior to entering the power transfer phase 640. For instance, the wireless power transmitter 100 may terminate the identification and configuration phase 630 to find another electronic device that can receive power in a wireless manner.

4) Power Transfer Phase

The wireless power transmitter 100 in the power transfer state 640 transmits power to the electronic device 200.

The wireless power transmitter 100 may receive a power control message from the electronic device 200 while transferring power, and control a characteristic of the power applied to the transmitting coil in response to the received power control message. The power control message used to control a characteristic of the power applied to the transmitting coil may be a message including a control error value. The wireless power transmitter 100 may control the power applied to the transmitting coil according to the control error value. In other words, a current applied to the transmitting coil may be controlled so as to be maintained if the control error value is "0," reduced if the control error value is a negative value, and increased if the control error value is a positive value.

The wireless power transmitter 100 may monitor parameters within a power transfer contract generated based on the identification information and/or configuration information in the power transfer phase 640. As a result of monitoring the parameters, if power transmission to the electronic device 200 violates the limits included in the power transfer contract, then the wireless power transmitter 100 may cancel the power transmission and return to the selection phase 610.

The wireless power transmitter 100 may terminate the power transfer phase 640 based on a power control message transferred from the electronic device 200.

For example, if the charging of a battery has been completed while charging the battery using power transferred by the wireless power receiver 200, then a power control message for requesting the suspension of wireless power transfer will be transferred to the wireless power transmitter 100. In this case, the wireless power transmitter 100 may receive a message for requesting the suspension of the power transmission, and then terminate wireless power transfer, and return to the selection phase 610.

For another example, the electronic device 200 may transfer a power control message for requesting renegotiation or reconfiguration to update the previously generated power transfer contract. The electronic device 200 may transfer a message for requesting the renegotiation of the power transfer contract when it is required a larger or smaller amount of power than the currently transmitted power amount. In this case, the wireless power transmitter 100 may receive a message for requesting the renegotiation of the power transfer contract, and then terminate contactless power transfer, and return to the identification and configuration phase 630.

To this end, a message transmitted by the electronic device 200, for instance, may be a message including an end power transfer code. The end power transfer code may indicate any one of charge complete, internal fault, over temperature, over voltage, over current, battery failure, reconfigure, no response, and unknown error.

Communication Method of a Plurality of Electronic Devices

Hereinafter, description will be given of a method of allowing one wireless power transmitter and one or more electronic devices to execute communication using a wireless power signal.

Figure 16:
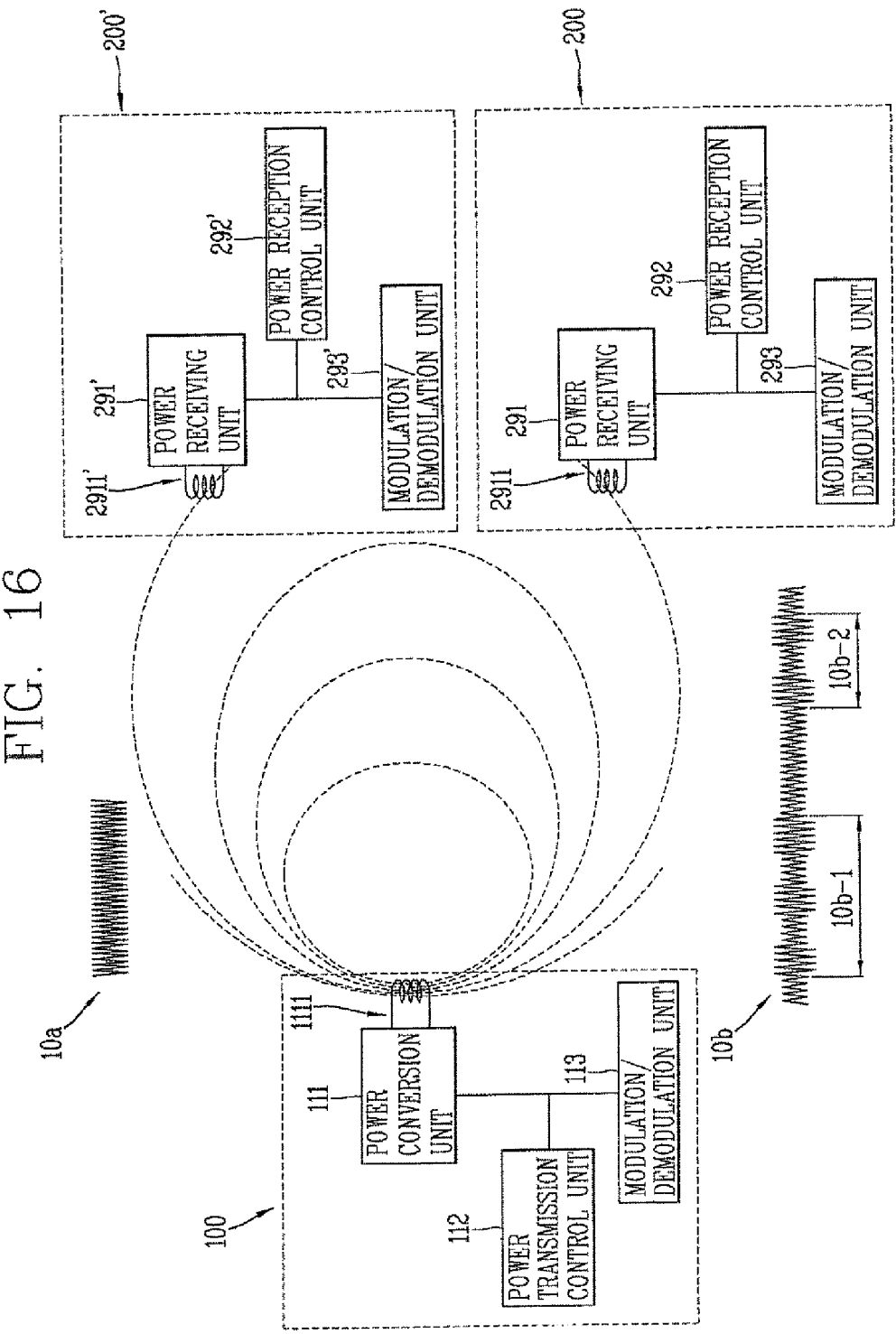
FIG. 16 is a conceptual view illustrating a method for transferring power from the wireless power transmitter to at least one wireless power receivers.

FIG. 16 is a conceptual view illustrating a method of allowing a wireless power transmitter to transfer power to one or more wireless power receivers.

The wireless power transmitter 100 may transfer power for one or more wireless power receivers 200 and 200'. FIG. 16 illustrates two electronic devices 200 and 200' but the method according to the exemplary embodiments disclosed herein may not be limited to the number of electronic devices illustrated.

The active area and the detection area may differ according to the wireless power transfer method of the wireless power transmitter 100. Therefore, the wireless power transmitter 100 may determine existence or absence of a wireless power receiver located in an active area or detection area of a resonance coupling method, or existence or absence of a wireless power receiver in an active area or detection area of an inductive coupling method. According to the determination result, the wireless power transmitter 100 supporting each wireless power transfer method may change the power transfer method with respect to each wireless power receiver.

In a wireless power transfer according to the exemplary embodiments disclosed herein, when the wireless power transmitter 100 transfers power to one or more electronic devices 200 and 200' according to the same wireless power transfer method, the electronic devices 200 and 200' may execute communication through the wireless power signal without collision with each other.

As illustrated in FIG. 16, a wireless power signal 10a generated by the wireless power transmitter 100 may arrive at a first electronic device 200' and a second electronic device 200. Each of the first electronic device 200' and the second electronic device 200 may transmit a power control message using the generated wireless power signal.

The first electronic device 200' and the second electronic device 200 may operate as a power receiver which receives the wireless power signal. The power receiver according to the exemplary embodiments disclosed herein may include a power receiving unit 291', 291 which receives the generated wireless power signal, a demodulation/modulation unit 293', 293 which demodulates and modulates the received wireless power signal, and a controller 292', 292 which controls each constituent element of the power receiver.

When the second electronic device 200 enters an active area while the wireless power transmitter 100 and the first electronic device 200' execute charging in a wireless manner using the wireless power signal 10a, the first electronic device 200' and the second electronic device 200 should execute communication using the wireless power signal 10a. To this end, the first electronic device 200' and the second electronic device 200 may demodulate the wireless power signal 10a, respectively. A wireless power signal 10b modulated through the modulation process may be divided into a portion 10b-1 which is modulated by the first electronic device 200' and a portion 10b-2 which is modulated by the second electronic device 200 on the time basis. As described hereinbelow, the first electronic device 200' and the second electronic device 200 may not execute the modulation for the wireless power signal 10a at the same time.

The demodulation/modulation unit 293', 293 of the power receiver according to the exemplary embodiments disclosed herein may also be implemented into a demodulation unit and a modulation unit. The demodulation unit may execute a demodulation process for obtaining a packet from a wireless power signal, which has been modulated by another power receiver. A detailed demodulation process of the demodulation unit is similar to a demodulation process executed by the demodulation/modulation unit 113 of the wireless power transmitter 100.

The power reception control unit 292 of the second electronic device 200 may decode a packet of the first electronic device 200' from the wireless power signal, demodulated by the demodulation/modulation unit 293, and determine whether it is possible to transmit the packet of the electronic device 200 without collision with the decoded packet. When the transmission is allowed according to the determination result, the power reception control unit 292 may control the demodulation/modulation unit 293 to modulate the received wireless power signal in such a manner of including the packet of the second electronic device 200 therein.

The determination as to whether the transmission is possible, executed by the power reception control unit 292, may be carried out to determine whether or not the wireless power signal generated by the wireless power transmitter 100 includes a signal area, in which the packet of the second electronic device 200 does not collide with a packet of another electronic device. Whether or not the transmission is possible may be determined based on a transmission period (interval) at which power receivers transmit packets, and lengths of packets which have been already included by other power receivers.

For instance, in order to determine whether or not the packet is transmittable, the second electronic device 200 may compare the sum of lengths of packets decoded and a length of the pack et that the second electronic device 200 desires to transmit with the transmission interval. When the transmission interval is greater than the sum of lengths according to the comparison result, the second electronic device 200 may determine that the packet is transmittable.

In another example, in order to determine whether or not the packet is transmittable, the second electronic device 200 may check whether or not there is a time slot, which has not been occupied by other power receivers, among time slots on the wireless power signal. When there is the non-occupied time slot according to the check result, the second electronic device 200 may determine that the packet transmission is impossible.

Afterwards, the power reception control unit 292 may decide a transmittable time when the transmission is impossible according to the determination result, and then transmit the packet of the second electronic device 200, which includes the power control message therein, to the wireless power transmitter 100 at the decided time.

On the other hand, when the transmission is impossible according to the determination result, the power reception control unit 292 may notify the impossible transmission to the wireless power transmitter 100. The power reception control unit 292 may transmit a packet including a predetermined control message so as to notify the impossible transmission.

Hereinafter, a method of allowing a power receiver moved in an active area to transmit a response packet without collision will be described with reference to FIG. 17.

Figure 17:
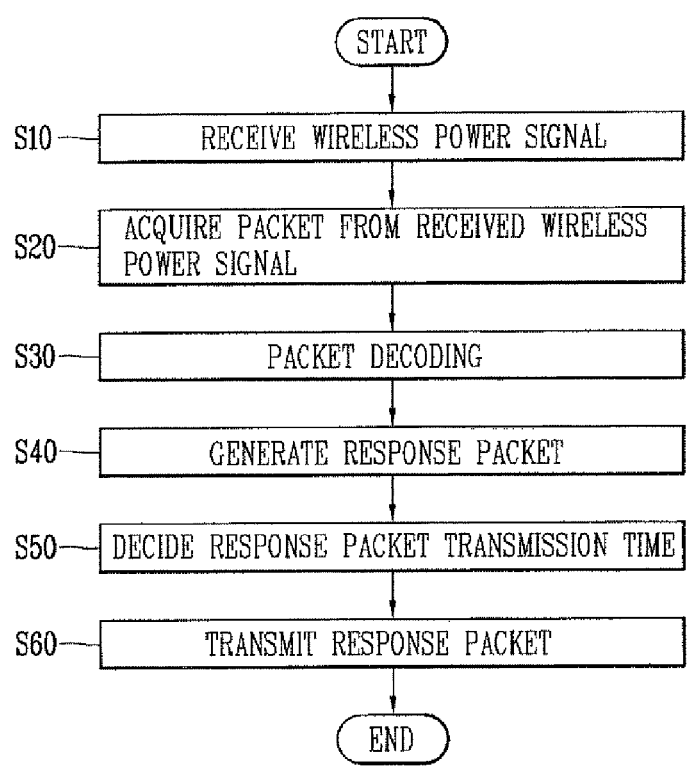
FIG. 17 is a flowchart illustrating a communication process of the electronic device in accordance with the exemplary embodiments disclosed herein.

FIG. 17 is a flowchart illustrating a communication process of the electronic device in accordance with the exemplary embodiments disclosed herein.

Similar to the foregoing embodiment, the power reception control unit 292 of the second electronic device 200, which is arranged late in the active area, in which the wireless power signal generated by the wireless power transmitter 100 arrives, may control the demodulation/modulation unit 293 to demodulate the wireless power signal modulated by the modulation unit 293' of the first electronic device 200'. Afterwards, the second electronic device 200 may generate a response packet, which the second electronic device 200 desires to transmit, based on information obtained from the demodulated wireless power signal, and decide a time to transmit the generated response packet to the wireless power transmitter 100 through a modulation process.

First, the second electronic device 200 may receive a wireless power signal by a power receiving unit 291 (S10). The wireless power signal may be received through a receiving coil 2911 included in the power receiving unit 291. Due to the wireless power signal received through the receiving coil 2911, a current may be generated in a resonant circuit 2912 within the power receiving unit 291 by resonance coupling. The generated current may be used to obtain data included in the wireless power signal.

Next, the second electronic device 200 may acquire one or packets based on the current generated by the received wireless power signal (S20). The packet acquiring step (S20) may be a demodulation process executed by the demodulation/modulation unit 293. When one or more electronic devices execute communication using the wireless power signal before the second electronic device 200 is arranged in the active area, the second electronic device 200 may acquire packets transmitted by the one or more electronic devices through the demodulation process. That is, in the foregoing embodiment, if the first electronic device 200' has modulated the wireless power signal in such a manner of including therein the packet that the first electronic device 200' desires to transmit to the wireless power transmitter 100, the second electronic device 200 may acquire the packet of the first electronic device 200' through the demodulation process.

Afterwards, the second electronic device 200 may decode the acquired one or more packets (S30). The packet decoding step (S30) may be a process of checking information included in the packets according to the packet structure, which has been explained with reference to FIG. 14. By the packet decoding step (S30), the second electronic device 200 may acquire identification information or originator addresses relating to the one or more electronic devices, which have transmitted the packets. Also, by the packet decoding step (S30), the second electronic device 200 may acquire lengths and transmission periods of the one or more packets. That is, in the aforementioned embodiment, the second electronic device 200 may acquire an originator address of the packet that the first electronic device 200' desires to transmit, a length of the packet of the first electronic device 200', or a transmission period at which the packet of the first electronic device 200' is transmitted.

Next, the second electronic device 200 may generate a response packet to transmit to the wireless power transmitter 100 (S40). The response packet may be configured in one of the packet forms described with reference to FIG. 14.

The generated response packet may include a power control message which the second electronic device 200 desires to transmit to the wireless power transmitter 100. The power control message may be one of those messages, which have been described with reference to FIG. 15.

Also, the generated response packet may be configured to include identification information on the second electronic device 200. The identification information on the second electronic device 200 may be originator information on the response packet. The originator information may be decided as information, which does not overlap any of the identification information on the one or more electronic devices acquired in the decoding step (S30). Afterwards, the wireless power transmitter 100 which receives the response packet may check a power receiver, which has transmitted the power control message, using the originator information included in the response packet.

Also, the generated response packet may include an indicator, which indicates a type of the power control message.

The second electronic device 200 may then decide a transmission time of the generated response packet (S50). The transmission time deciding step (S50) may be executed earlier than the response packet deciding step (S40).

Figure 18:
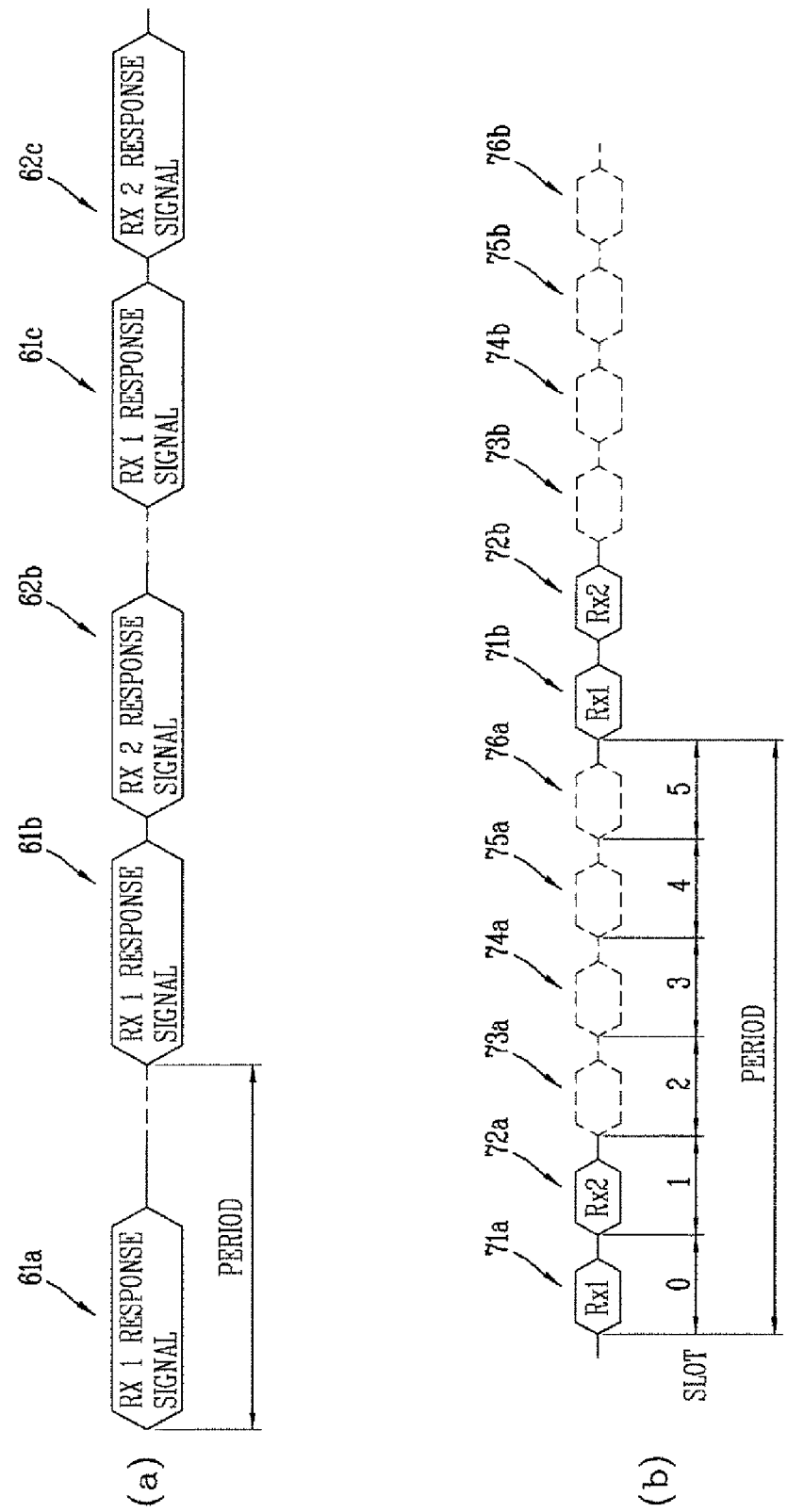
FIG. 18 is a view illustrating a timing of a response packet transmitted by at least one electronic device through a wireless power signal.

The response packet may be transmitted using the wireless power signal. That is, the power reception control unit 292 included in the second electronic device 200 may control the wireless power signal to be modulated in such a manner of including the response packet therein. However, since the wireless power signal can be modulated by the one or more other electronic devices for the packet transmission, the transmission time should be decided in such a manner than the wireless power signal can be modulated by the second electronic device 200 within a non-modulated time range. Hereinafter, description will be given of the method in which the electronic device according to the embodiments disclosed herein decides the transmission time of the response packet. FIG. 18 is a view illustrating a timing of each response packet transmitted by the one or more electronic device through the wireless power signal.

In exemplary embodiments, the second electronic device 200 may decide the transmission time of the response packet based on the packet transmission periods of the one or more other electronic devices. Referring to FIG. 18A, the second electronic device 200 may check transmission periods of response packets 61*a*, 61*b* and 61*c* of the first electronic device 200'. The transmission period may be checked through the decoding step (S30), or by analyzing a modulated form of the wireless power signal. Here, the second electronic device 200 may determine whether or not the response packet of the second electronic device 200 is allowed to be transmitted within a non-modulated time domain of the wireless power signal, by taking lengths of the response packets 61*a*, 61*b* and 61*c* of the first electronic device 200' into consideration. According to the determination result as to whether the response packet is transmittable, if the response packet of the second electronic device is allowed to be transmitted, the second electronic device 200 may decide a transmission time of the response packet within the non-modulated time domain of the wireless power signal. Referring to FIG. 18A, specific time points within a time until a time point, at which the response packets 61*b* and 61*c* of the first electronic device 200' arrive at the transmission period after being received, may be decided as each transmission time of the response packets 62*b* and 62*c*.

In exemplary embodiments, the second electronic device 200 may decide the transmission time of the response packet by selecting a time slot for transmitting the generated response packet. Referring to FIG. 18B, the second electronic device 200 may determine whether or not there is a non-occupied time slot among time slots, which are divided in advance on the wireless power signal according to a predetermined time interval. When there are such non-occupied time slots according to the determination result, the second electronic device 200 may decide a time slot for transmitting the response packet among those non-occupied time slots. The decided time slot may be a slot, which can be used on the received wireless power signal without collision with the response packets of the first electronic device 200' and the decoded packets. Referring to FIG. 18B, when a slot 0 is occupied for a packet of the first electronic device 200', the second electronic device 200 may select one of the other slots 1 to 5 as a time slot for transmitting the response packet.

Next, the second electronic device 200 may transmit the generated response packet at the decided time (S60). The response packet transmitting step (S60) may be a process of modulating the wireless power signal to include the response packet therein.

The wireless power transmitter 100 may demodulate the modulated wireless power signal so as to obtain the packets transmitted from the first electronic device 200' and the second electronic device 200. In this case, the wireless power transmitter 100 may control a wireless power transferring process based on the originator information and the power control messages included in the obtained packets.

Meanwhile, the method in which the wireless power transmitter 100 executes communication with the one or more electronic devices for power control using the wireless power signal corresponds to the aforementioned method.

In detail, when the wireless power transmitter 100 generates a wireless power signal, one or more electronic devices 200 and 200' may modulate the generated wireless power signal, respectively, and transmit packets to the wireless power transmitter 100.

The wireless power transmitter 100 may receive the modulated wireless power signals and demodulate the modulated wireless power signals so as to acquire each packet transmitted from the electronic devices 200 and 200'. Afterwards, the wireless power transmitter 100 may adjust the generated wireless power signal for the electronic devices corresponding to originator addresses included in the acquired packets. The adjusting step may be executed based on power control messages, which are included in the respective packets together with the originator addresses.

Also, the wireless power transmitter 100 may adjust a transmission state with each electronic device based on a difference sensed in a periodic manner.

That is, the wireless power transmitter 100 may receive a modulated wireless power signal of a first period, and demodulate the wireless power signal of the first period, thus to acquire packets belonging to the first period. Here, the wireless power transmitter 100, as aforementioned, may adjust power supplied for generating the wireless power signal based on the originator address and the control message of each packet belonging to the first period.

Afterwards, the wireless power transmitter 100 may receive a modulated wireless power signal of a second period, and demodulate the wireless power signal of the second period, thus to acquire packets belonging to the second period. Here, the wireless power transmitter 100 may adjust a power transmission state of each electronic device 200 and 200' using the difference of those packets belonging to the first and second periods.

In detail, in exemplary embodiments, the wireless power transmitter 100 may determine whether or not a new electronic device 200 has been added based on the originator addresses of the packets belonging to the second period. In this case, the wireless power transmitter 100 may carry out an identification or configuration process in the aforementioned identification and configuration phase, with respect to an electronic device 200 corresponding to an originator address newly detected from the packets belonging to the second period.

Also, in exemplary embodiments, the wireless power transmitter 100 may determine whether or not a new electronic device 200 has been added based on time slots occupied by the packets belonging to the second period. That is, when the one or more electronic devices 200 and 200' transmit packets by occupying the wireless power signal on the time slot basis, the wireless power transmitter 100 may compare the time slots occupied by the packets at the first period with the time slots occupied by the packets at the second period. Afterwards, the wireless power transmitter 100 may carry out control processes in the identification and configuration phase, with respect to the electronic device 200 corresponding to a slot newly occupied by the packet belonging to the second period.

The aforementioned methods may be implemented in a computer- or other similar device-readable medium, for example, using software, hardware or a combination thereof.

For a hardware implementation, the embodiments described herein may be implemented by using at least any one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein. For example, the foregoing methods may be implemented by the controller 180 or power transmission control unit 112 of the wireless power transmitter 100. Or, the methods may be implemented by the controller 280 or power reception control unit 292 of the electronic device 200.

For a software implementation, the embodiments such as procedures and functions disclosed herein may be implemented with separate software modules. Each of the software modules may perform one or more of the functions and operations described herein. Software codes may be implemented by using a software application written in a suitable programming language. The software codes may be stored in the memory 150 of the wireless power transmitter 100, and executed by the control unit 180 or the power transmission control unit 112. Similarly, the software codes may be stored in the memory 260 of the electronic device 200 and executed by the controller 280 or the power reception control unit 292.

The scope of the invention will not be limited to the embodiments disclosed herein, and thus various modifications, variations, and improvements can be made in the present invention without departing from the spirit of the invention, and within the scope of the appended claims.

The invention claimed is:

1. A power receiver for transmitting a message using a power transmission signal, the power receiver comprising:
a power receiving unit that is configured to receive a wireless power signal generated by a power transmitter;
a demodulation unit that is configured to demodulate the received wireless power signal;
a modulation unit that is configured to modulate the received wireless power signal; and
a controller that is configured to decode a first packet from the wireless power signal demodulated by the demodulation unit, determine whether or not a second packet is transmittable without collision with the decoded first packet, and control the modulation unit to modulate the received wireless power signal, in such a manner of including the second packet therein, when the second packet is transmittable according to the determination result.

2. The power receiver of claim 1, wherein the determination as to whether or not the second packet is transmittable is carried out based on a transmission period of the first packet and a length of the decoded first packet.

3. The power receiver of claim 2, wherein the determination as to whether or not the second packet is transmittable is carried out in such a manner that the transmission period of the first packet is compared with the sum of lengths of the decoded first packet and the second packet, and the second packet is determined as being transmittable when the transmission period of the first packet is greater than the sum of lengths according to the comparison result.

4. The power receiver of claim 3, wherein the controller modulates the received wireless power signal to include the second packet therein after the first packet is decoded, when the second packet is transmittable according to the determination result.

5. The power receiver of claim 3, wherein the controller modulates the received wireless power signal to include a packet indicating that the second packet is not transmittable after the first packet is decoded, when the second packet is not transmittable according to the determination result.

6. The power receiver of claim 1, wherein the second packet comprises an originator address, and
wherein the controller decides an address, which is different from an originator address of the decoded first packet, as the originator address of the second packet.

7. The power receiver of claim 6, wherein the second packet comprises a strength of the received wireless power signal, a frequency or power transmission state information.

8. The power receiver of claim 1, wherein the power receiving unit comprises a resonant circuit that is configured to generate a magnetic resonance in response to the received wireless power signal,
wherein the demodulation unit demodulates the wireless power signal by acquiring the first packet from a current, generated due to the magnetic resonance generated in the resonant circuit, and
wherein the modulation unit modulates the wireless power signal by changing a load connected to the power receiver based on the second packet.

9. A method for transmitting a control message, performed by a wireless power receiver to take part in communication using a power signal, the method comprising:
receiving a wireless power signal received by a coil;
acquiring one or more packets based on a current generated in response to the received wireless power signal;
decoding the acquired one or more packets;
deciding a slot to be useable on the received wireless power signal without collision with the decoded packets;
generating a response packet including originator information and a control message; and
transmitting the response packet by changing a load connected to the coil in such a manner that the response packet is included in the decided slot of the wireless power signal.

10. The method of claim 9, wherein the useable slot is decided as one of slots non-occupied by the one or more packets within a transmission period of the packets.

11. The method of claim 9, wherein the generating of the response packet comprises:
checking originator information related to the decoded packets; and deciding identification information, which does not overlap the checked originator information, as the originator information related to the response packet.

12. A control method for a power transmitter which adjusts a wireless power transfer based on a wireless power signal modulated by one or more power receivers, the control method comprising:
- generating a wireless power signal;
- receiving a modulated wireless power signal of a first period;
- acquiring packets belonging to the first period by demodulating the wireless power signal of the first period;
- adjusting power supplied for generating the wireless power signal based on originator addresses and control messages of the packets belonging to the first period,
- receiving a modulated wireless power signal of a second period;
- acquiring packets belonging to the second period by demodulating the wireless power signal of the second period;
- comparing the originator addresses of the packets belonging to the first period with the originator addresses of the packets belonging to the second period; and
- changing a phase of the one or more power receivers based on the comparison result.

13. The method of claim 12, wherein the changing of the phase of the one or more power receivers comprises:
- carrying out an identification process with respect to a new power receiver when the new power receiver is detected according to the comparison result, and
- wherein the detected new power receiver is a power receiver corresponding to an originator address, which is not included in the packets acquired at the first period, among the originator addresses included in the packets acquired at the second period.

14. The method of claim 12, wherein the changing of the phase of the one or more power receiver comprises:
- carrying out an identification process with respect to a new power receiver when the new power receiver is detected according to the comparison result, and
- wherein the detected new power receiver is a power receiver corresponding to a slot, which is not occupied by the packets acquired at the first period, among time slots occupied by the packets acquired at the second period.

* * * * *